(12) United States Patent
Ichiki

(10) Patent No.: US 10,177,572 B2
(45) Date of Patent: Jan. 8, 2019

(54) DC/AC SYSTEM INTERCONNECTION DEVICE AND AC/AC SYSTEM INTERCONNECTION DEVICE

(71) Applicant: FUJITSU GENERAL LIMITED, Kanagawa (JP)

(72) Inventor: Satoshi Ichiki, Kanagawa (JP)

(73) Assignee: Fujitsu General Limited, Kanagawa (JP)

( * ) Notice: Subject to any disclaimer, the term of this patent is extended or adjusted under 35 U.S.C. 154(b) by 0 days.

(21) Appl. No.: 15/561,959

(22) PCT Filed: Mar. 25, 2016

(86) PCT No.: PCT/JP2016/059774
§ 371 (c)(1),
(2) Date: Sep. 26, 2017

(87) PCT Pub. No.: WO2016/158804
PCT Pub. Date: Oct. 6, 2016

(65) Prior Publication Data
US 2018/0115162 A1    Apr. 26, 2018

(30) Foreign Application Priority Data

Mar. 31, 2015  (JP) .................................. 2015-074050
Feb. 29, 2016  (JP) .................................. 2016-038044

(51) Int. Cl.
*H02M 5/458*   (2006.01)
*H02M 7/797*   (2006.01)
(Continued)

(52) U.S. Cl.
CPC .................. *H02J 3/14* (2013.01); *H02J 3/36* (2013.01); *H02M 5/458* (2013.01); *H02M 7/797* (2013.01); *Y02E 60/60* (2013.01)

(58) Field of Classification Search
CPC ........... H02M 5/458; H02M 7/797; H02J 3/14
See application file for complete search history.

(56) References Cited

U.S. PATENT DOCUMENTS 7,701,740 B2 *  4/2010  Yamanaka ............ H02M 5/297
                                                 363/149
7,881,087 B2 *  2/2011  Sakakibara ........... H02M 5/275
                                                 363/159
(Continued)

FOREIGN PATENT DOCUMENTS

EP    2 448 101 A1    5/2012
EP    3 276 813 A1    1/2018
(Continued)

OTHER PUBLICATIONS

Search Report issued in corresponding International Patent Application No. PCT/JP2016/059774, dated Jun. 14, 2016.
(Continued)

*Primary Examiner* — Jeffrey Gblende
*Assistant Examiner* — David A. Singh
(74) *Attorney, Agent, or Firm* — McDermott Will & Emery LLP

(57) ABSTRACT

A device includes a bidirectional switch circuit 10, a control unit 20 that performs virtual AC/DC conversion processing to acquire a plurality of interline voltage generation sections according to a plurality of modes divided according to a magnitude relation between voltages in each phase and that generates a switching pattern of the bidirectional switch circuit 10 to perform virtual DC/DC conversion processing corresponding to the plurality of interline voltage generation sections based on a second carrier waveform pattern CW2 according to the plurality of modes and a signal level G1 of a P-phase, a current setting unit 50 that inputs a current direction and an amount of current that flows in a power line LU, a current detection unit 51 that detects the current
(Continued)

direction and the amount of current of the power line LU, and a current adjustment unit 52 that increases and decreases the signal level G1.

6 Claims, 17 Drawing Sheets

(51) Int. Cl.
*H02J 3/14* (2006.01)
*H02J 3/36* (2006.01)

(56) References Cited

U.S. PATENT DOCUMENTS

| | | | | |
|---|---|---|---|---|
| 8,817,505 | B2* | 8/2014 | Ichiki | H02M 7/219 |
| | | | | 363/84 |
| 8,885,377 | B2* | 11/2014 | Yamamoto | H02M 5/297 |
| | | | | 363/148 |
| 8,913,405 | B2* | 12/2014 | Sakakibara | H02M 5/297 |
| | | | | 363/34 |
| 8,941,350 | B2* | 1/2015 | Otsuka | H02M 5/293 |
| | | | | 318/685 |
| 8,964,424 | B2* | 2/2015 | Sakakibara | H02M 5/297 |
| | | | | 363/37 |
| 9,276,489 | B2* | 3/2016 | Fujita | H02M 5/4585 |
| 2008/0024078 | A1 | 1/2008 | Oyobe et al. | |
| 2010/0308892 | A1* | 12/2010 | Sakakibara | H02M 5/4585 |
| | | | | 327/482 |
| 2011/0019452 | A1* | 1/2011 | Shinomoto | H02M 1/4208 |
| | | | | 363/126 |
| 2011/0122661 | A1* | 5/2011 | Sakakibara | H02M 5/4585 |
| | | | | 363/37 |
| 2014/0226386 | A1* | 8/2014 | Saito | H02M 5/293 |
| | | | | 363/132 |
| 2015/0372610 | A1* | 12/2015 | Ichiki | H02M 5/293 |
| | | | | 363/163 |
| 2018/0048242 | A1* | 2/2018 | Ichiki | H02M 5/27 |

FOREIGN PATENT DOCUMENTS

| | | |
|---|---|---|
| JP | 2000-245065 A | 9/2000 |
| JP | 2003-037939 A | 2/2003 |
| JP | 2003-088174 A | 3/2003 |
| JP | 2005-348544 A | 12/2005 |
| JP | 2010-093868 A | 4/2010 |
| JP | 2010-115081 A | 5/2010 |
| JP | 2014-143825 A | 8/2014 |

OTHER PUBLICATIONS

Extended European Search Report issued in corresponding European Patent Application No. 16772685.0, dated Oct. 25, 2018.

\* cited by examiner

[Fig. 1]
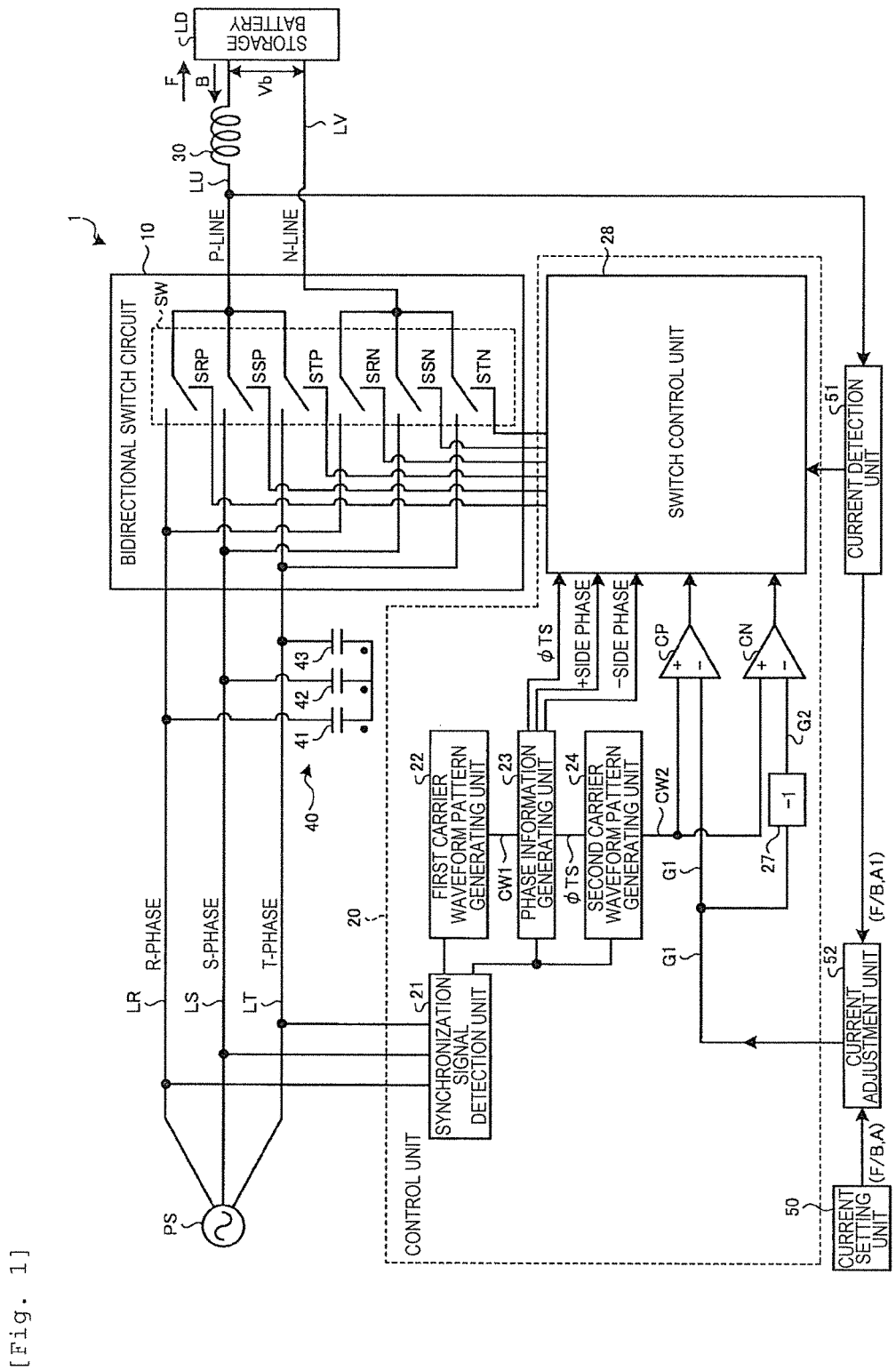

[Fig. 2]
(a) 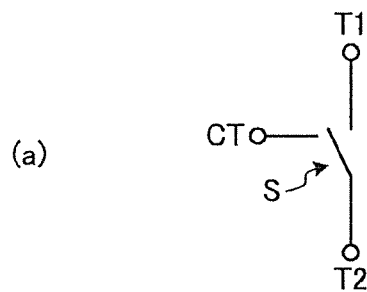
(b) 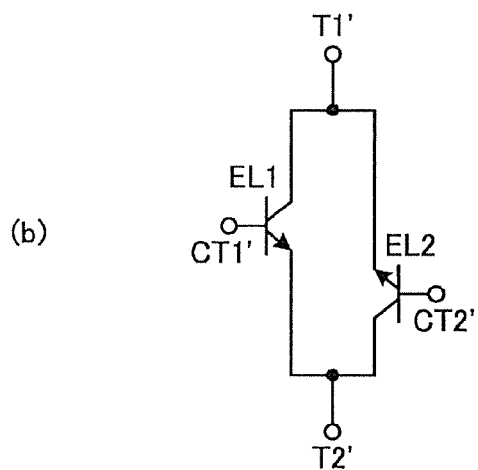
(c) 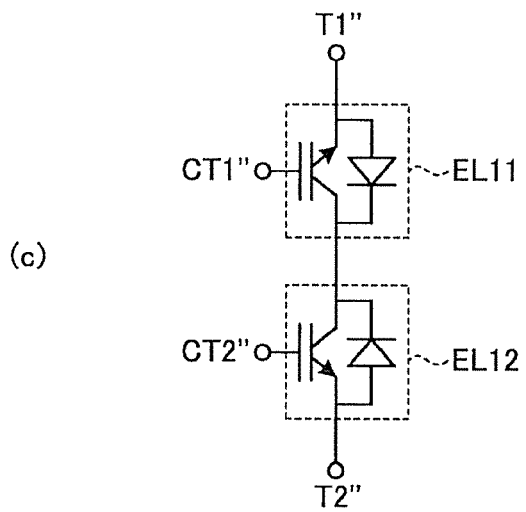

[Fig. 3]
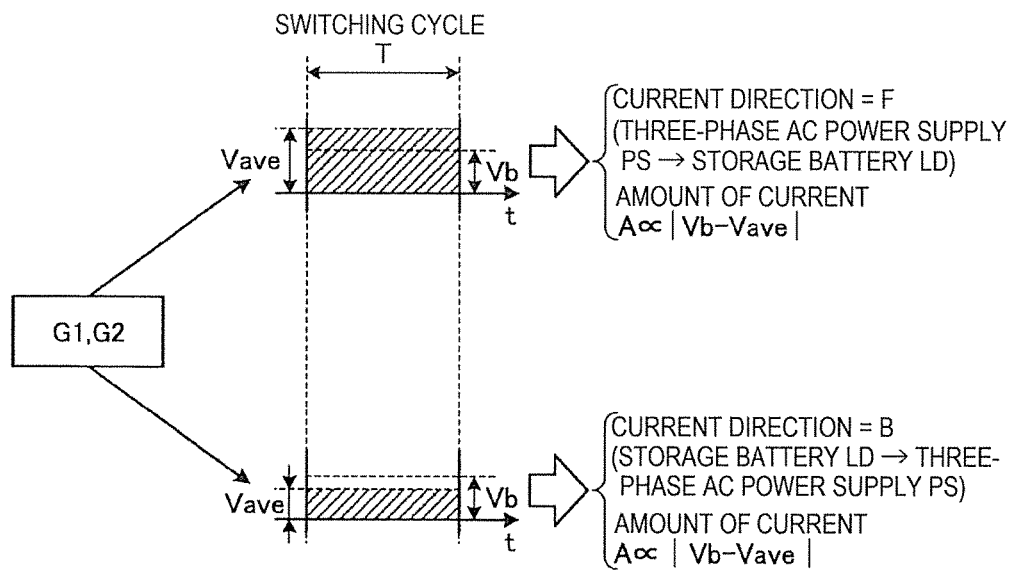

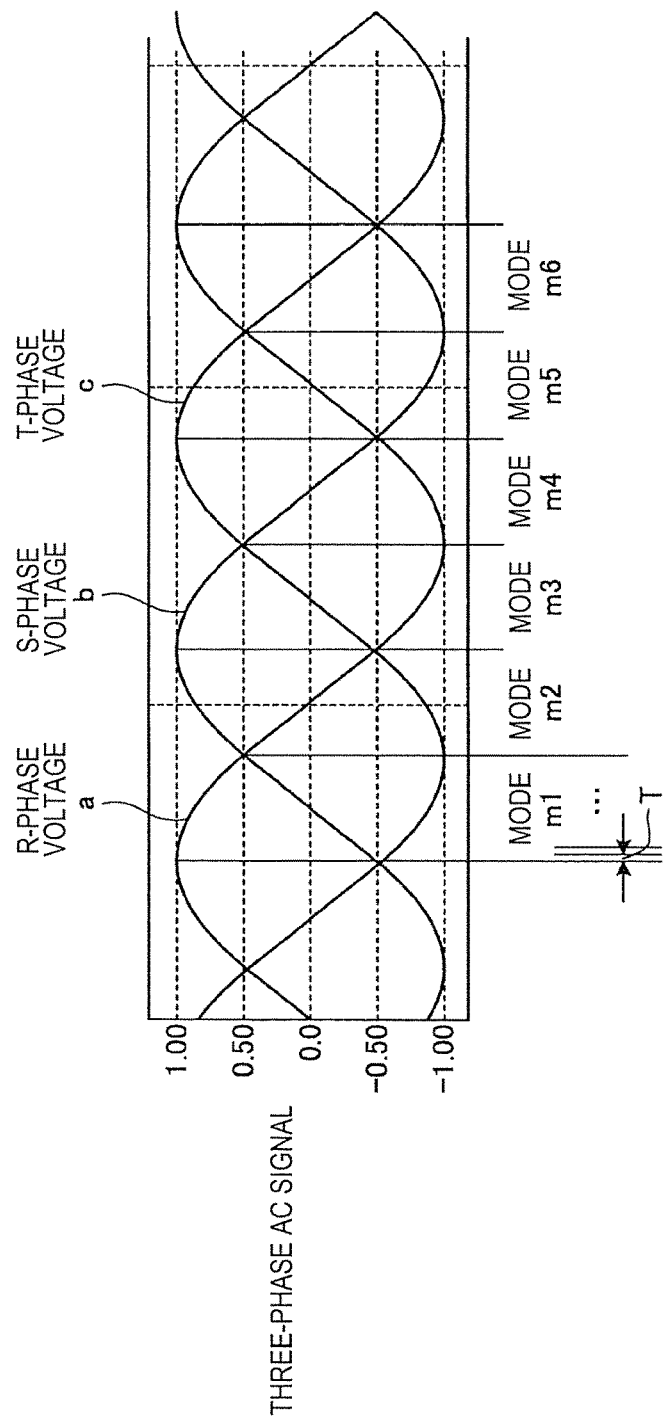
[Fig. 4]

[Fig. 5]
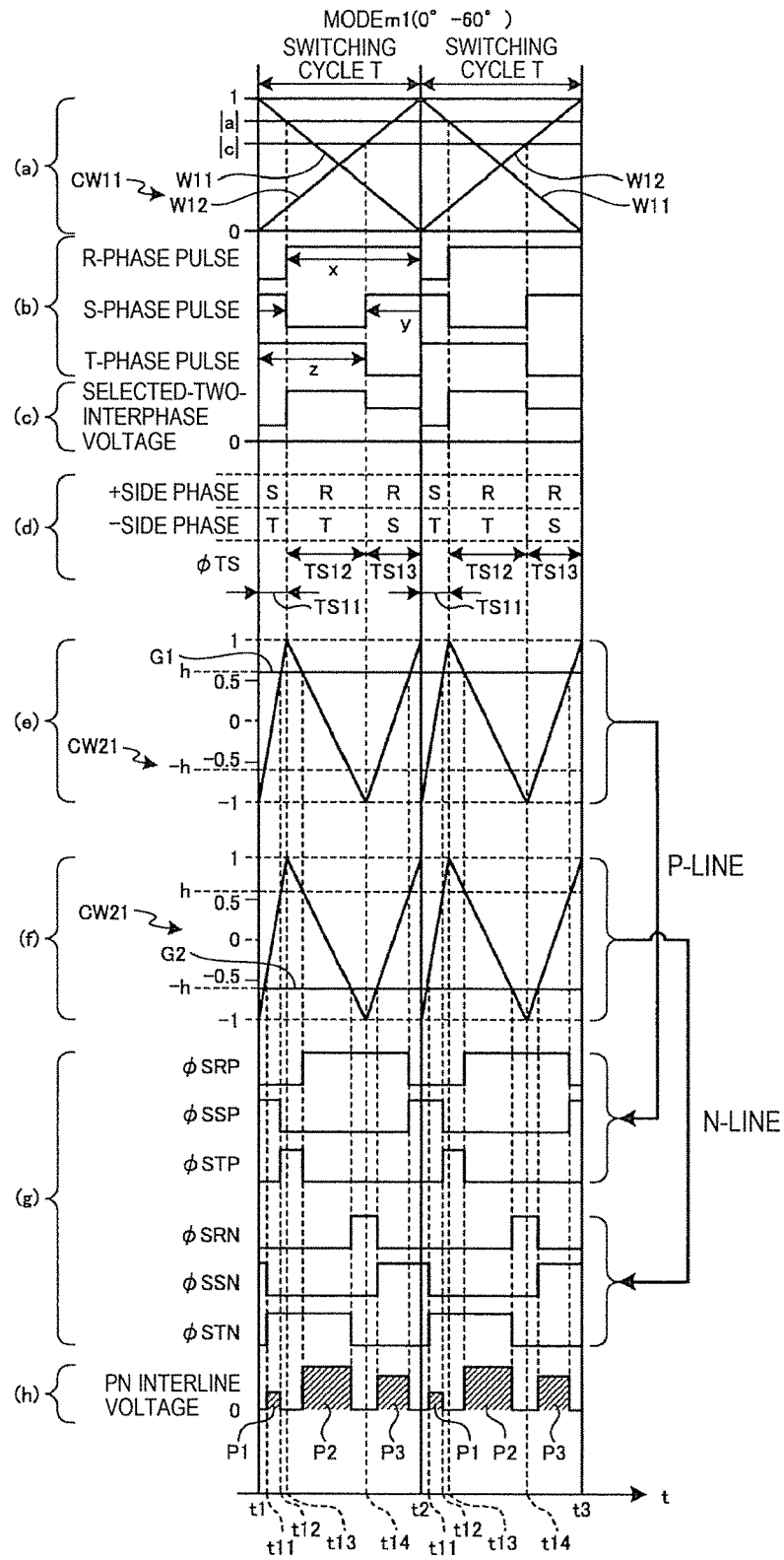

[Fig. 6]
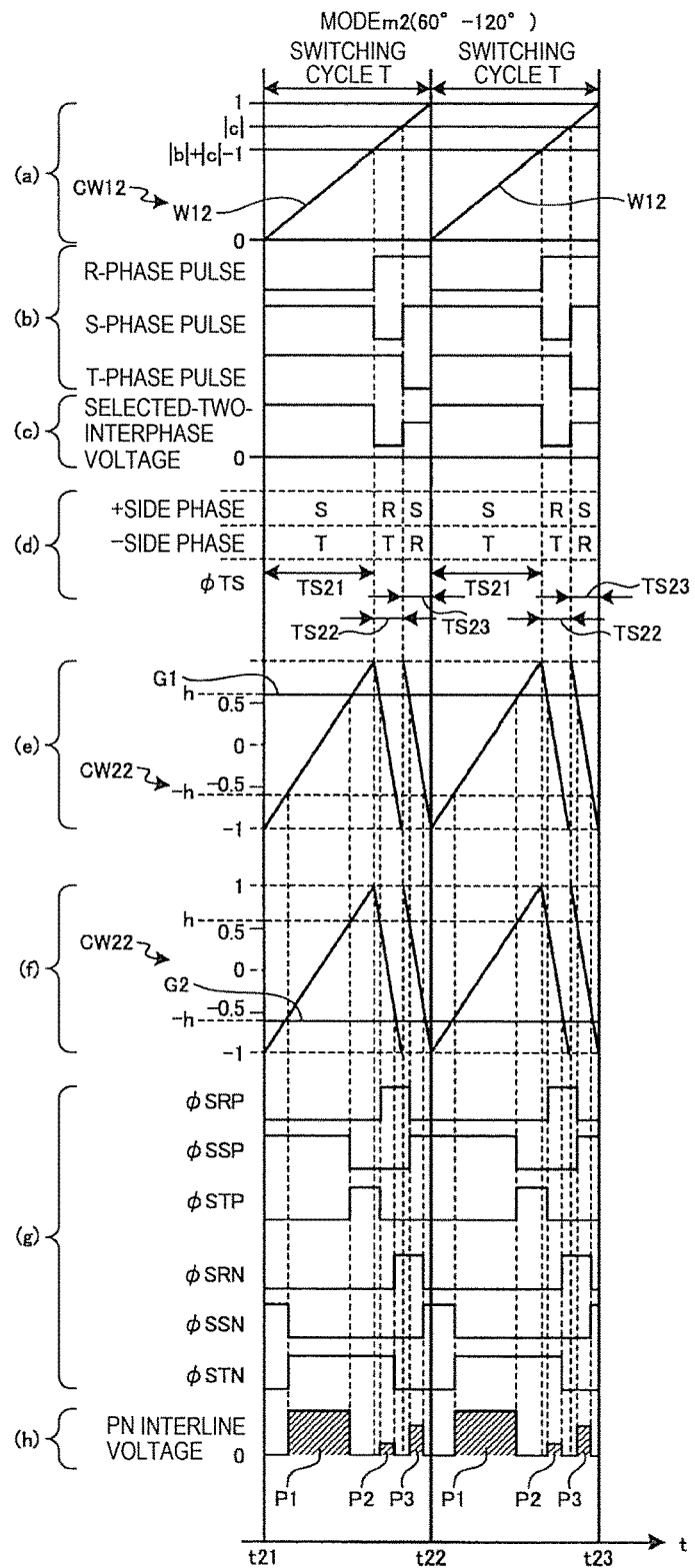

[Fig. 7]
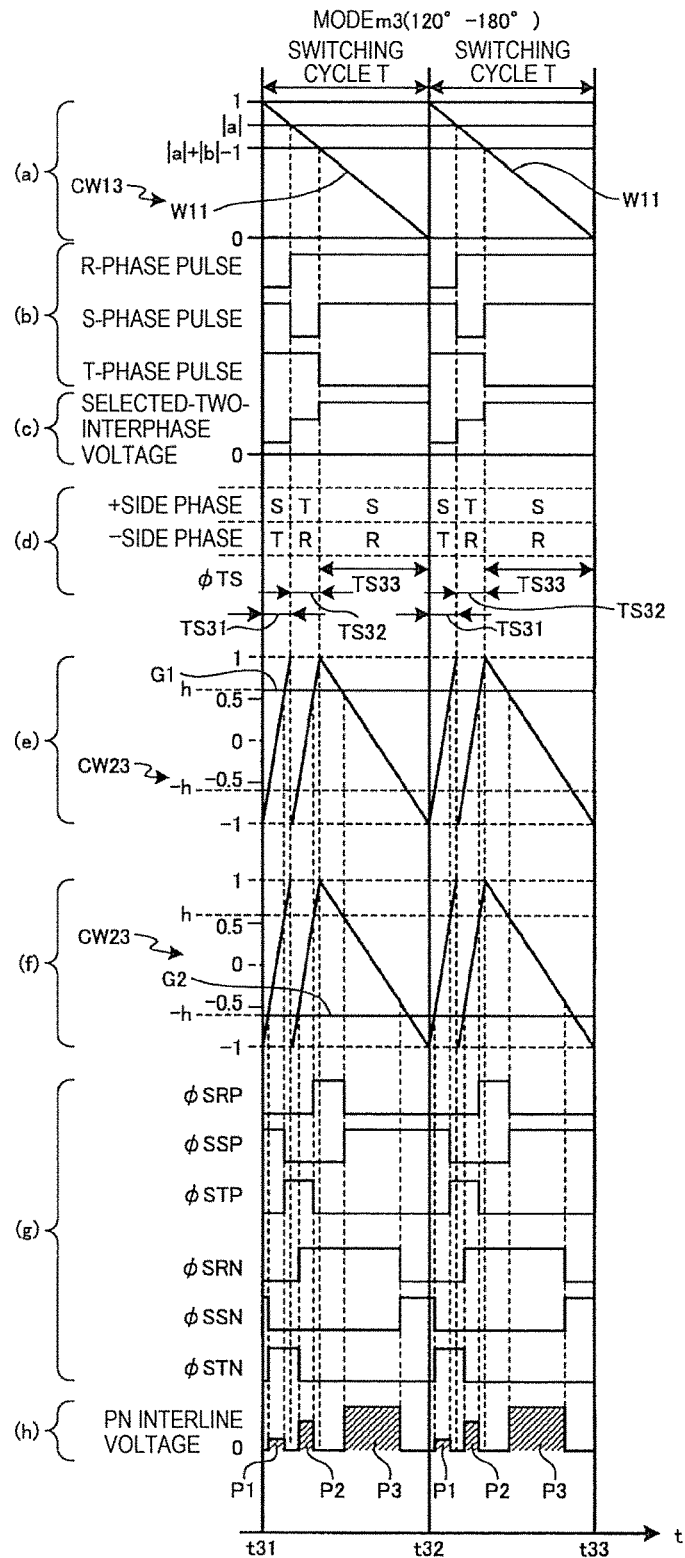

[Fig. 8]
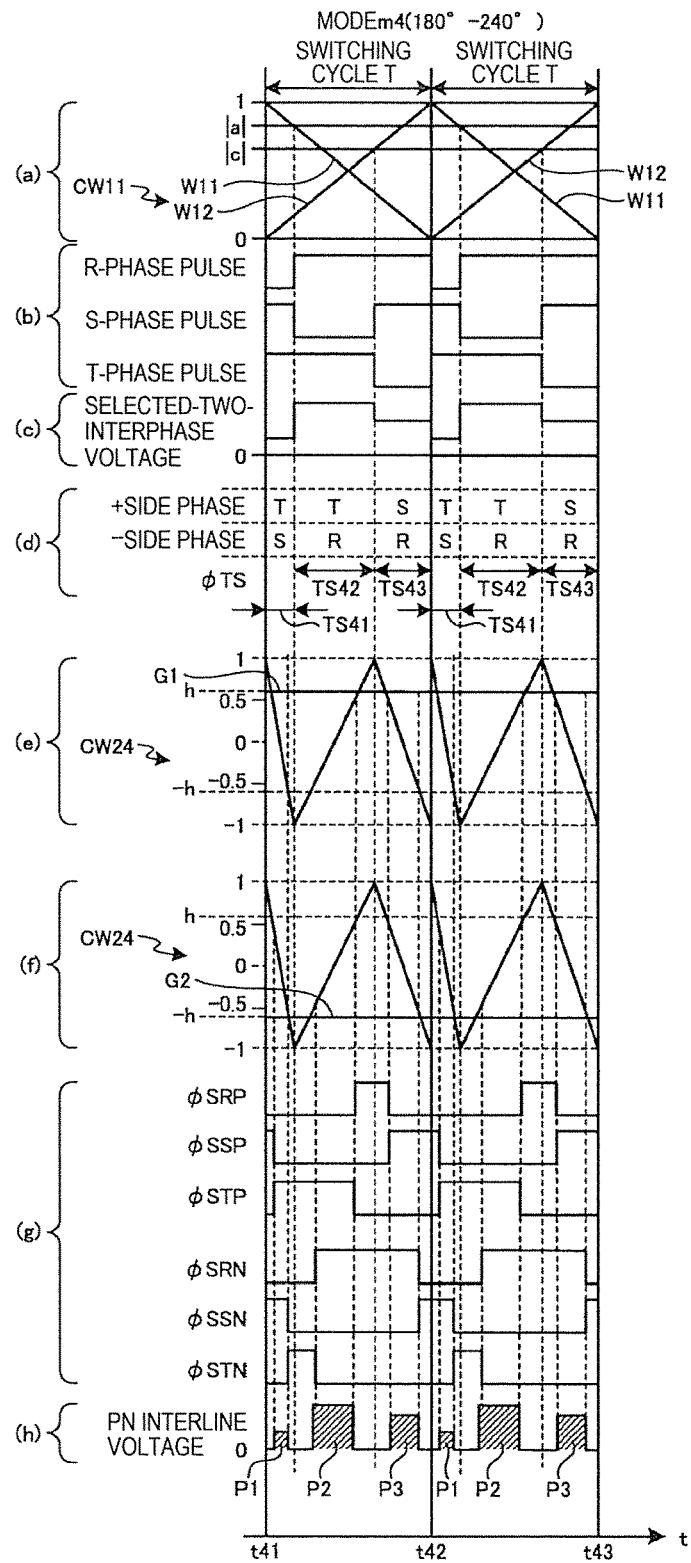

[Fig. 9]
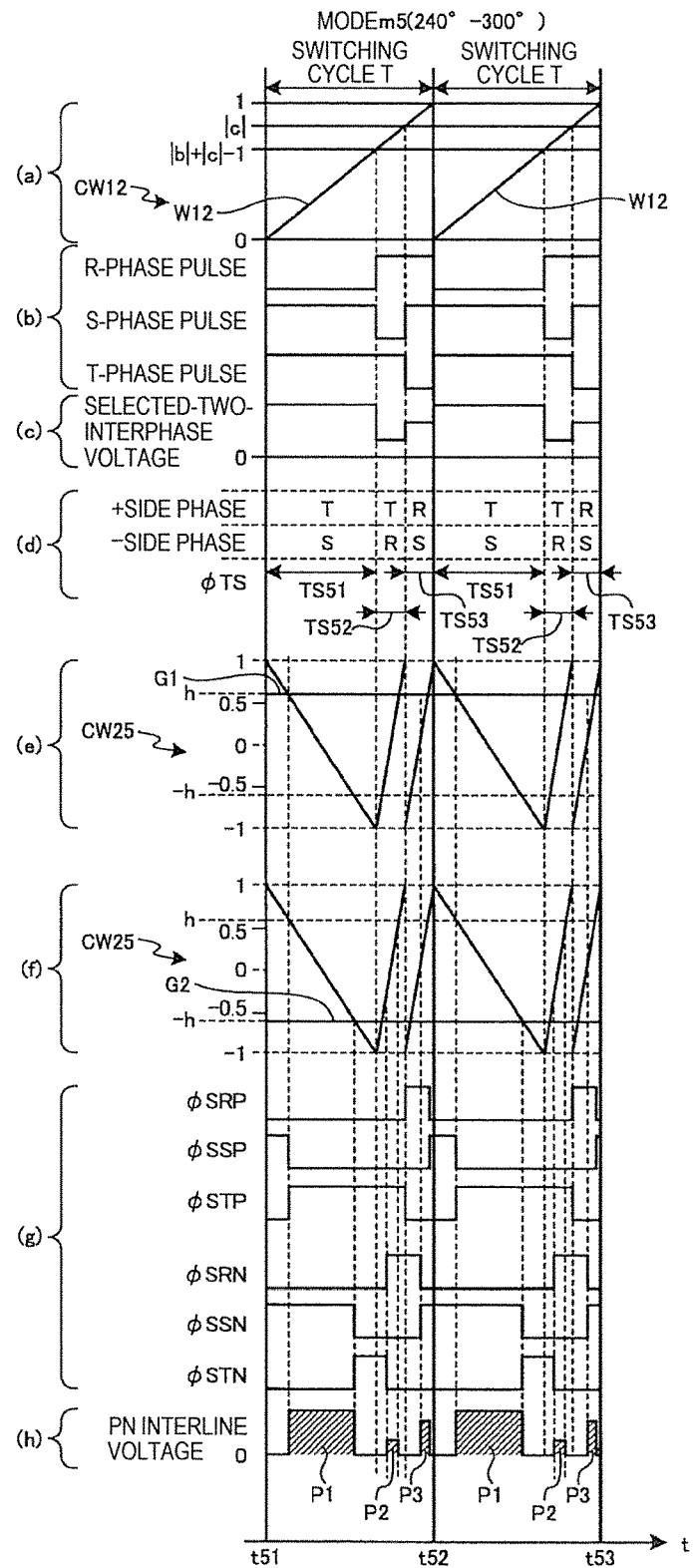

[Fig. 10]
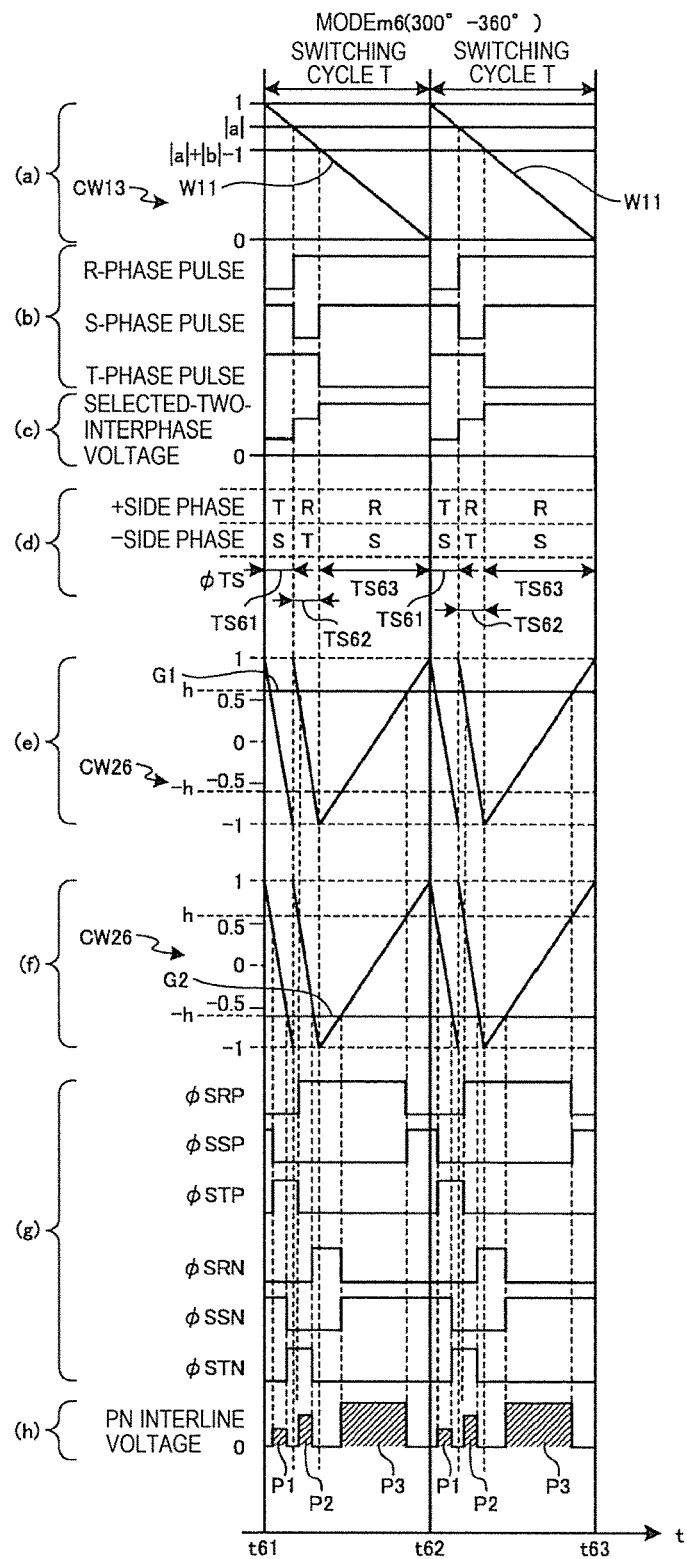

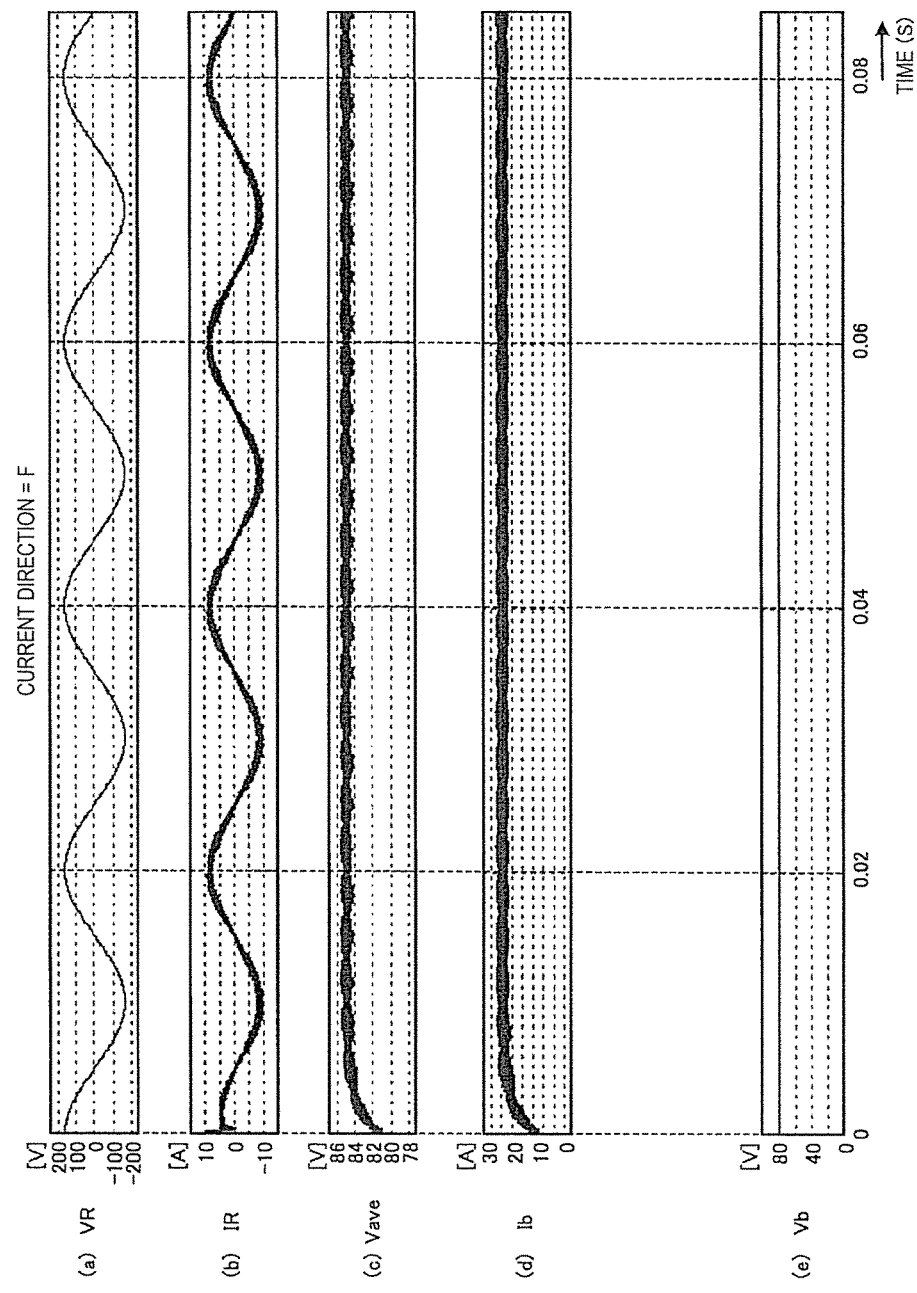
[Fig. 11]

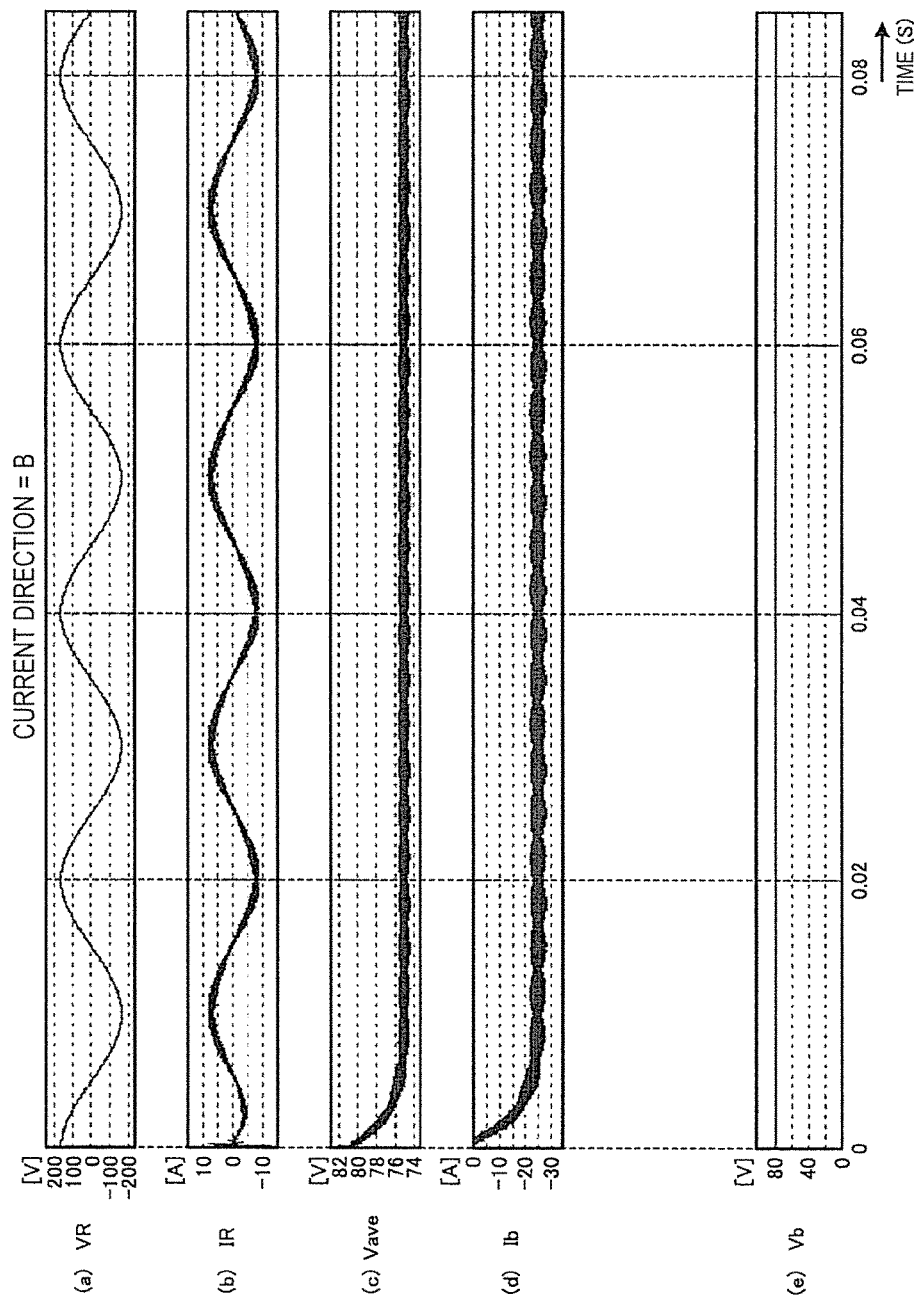
[Fig. 12]

[Fig. 13]
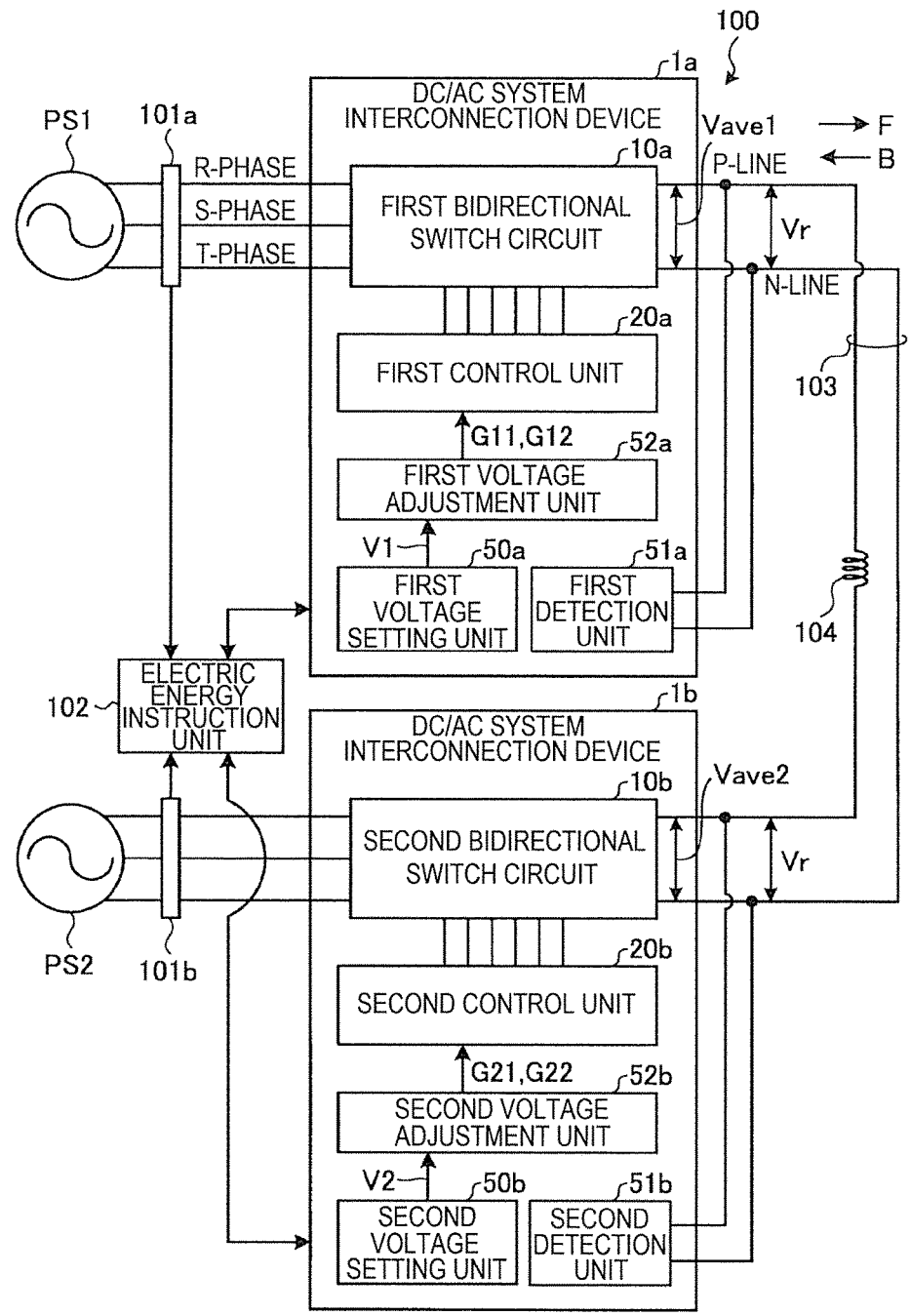

[Fig. 14]
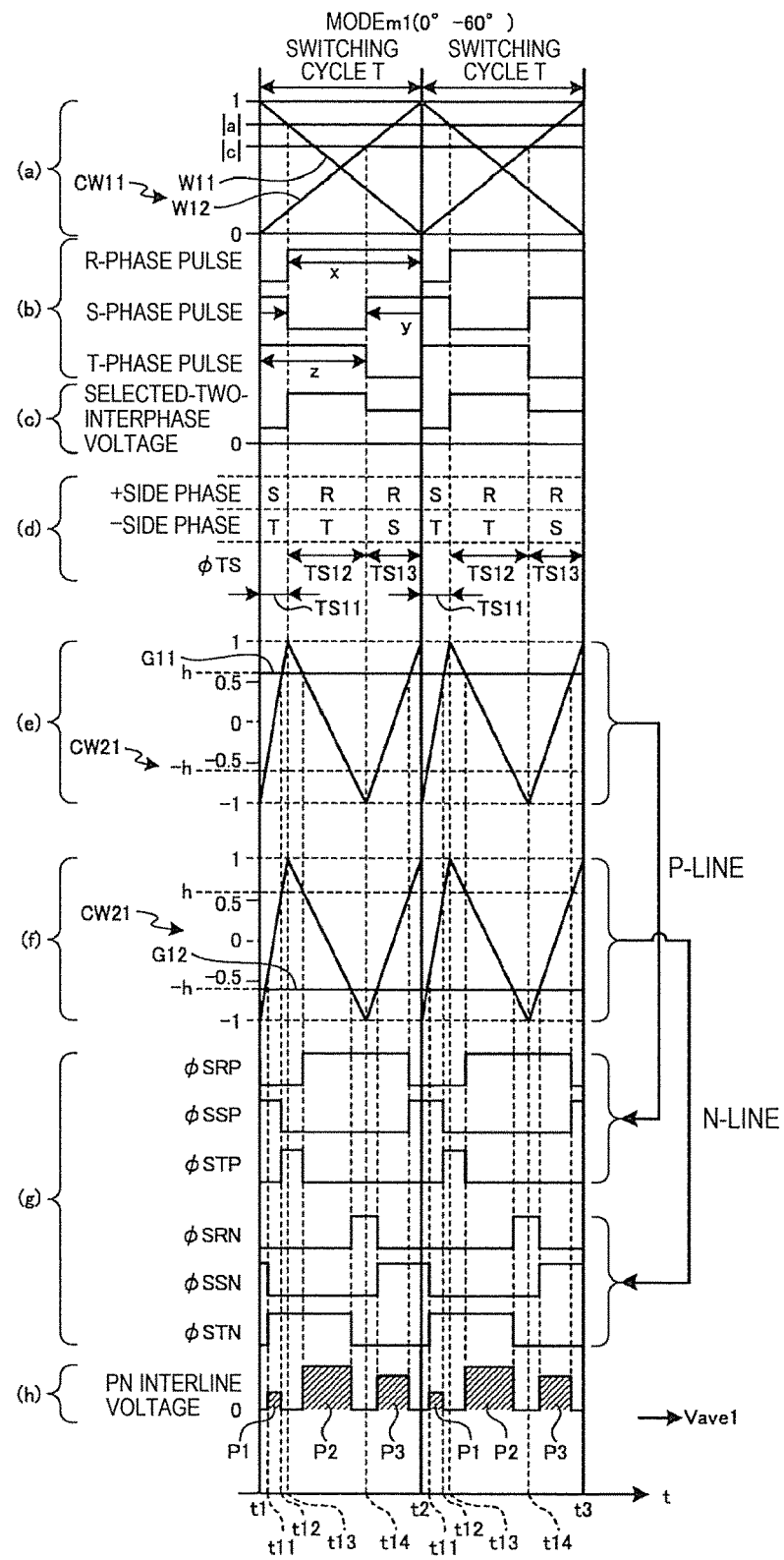

[Fig. 15]
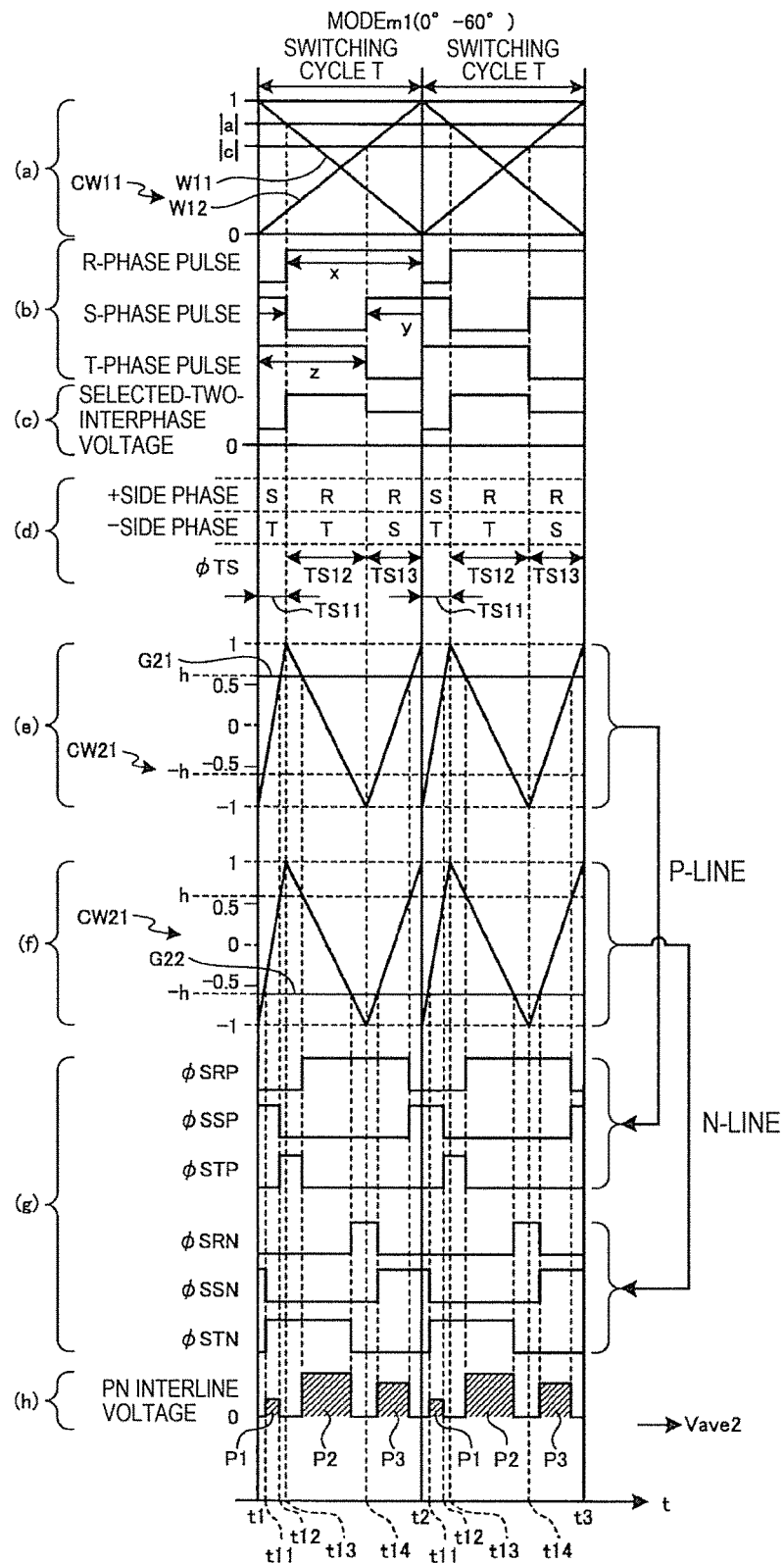

[Fig. 16]
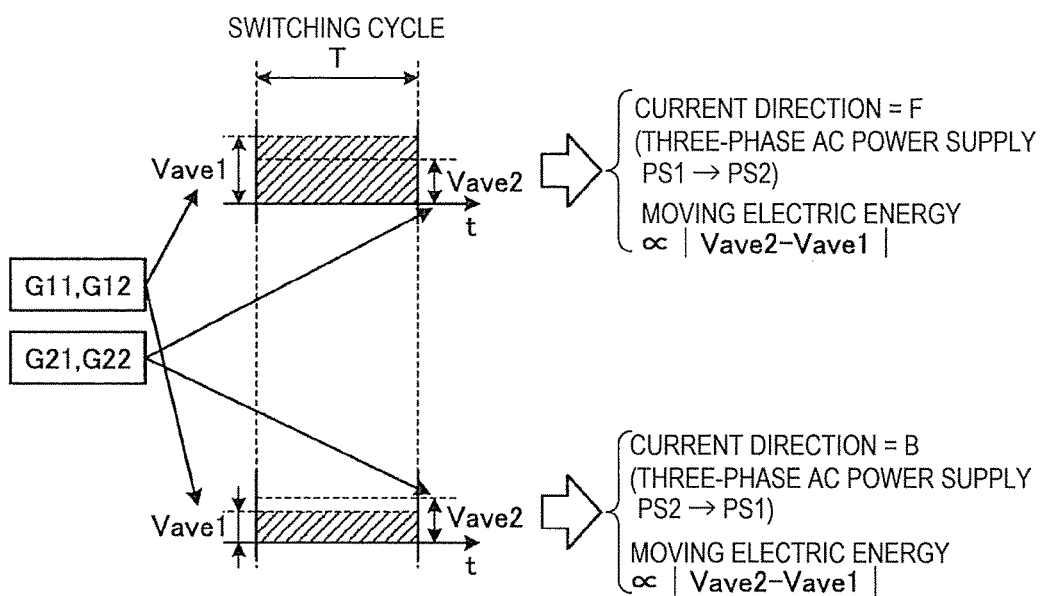

[Fig. 17]
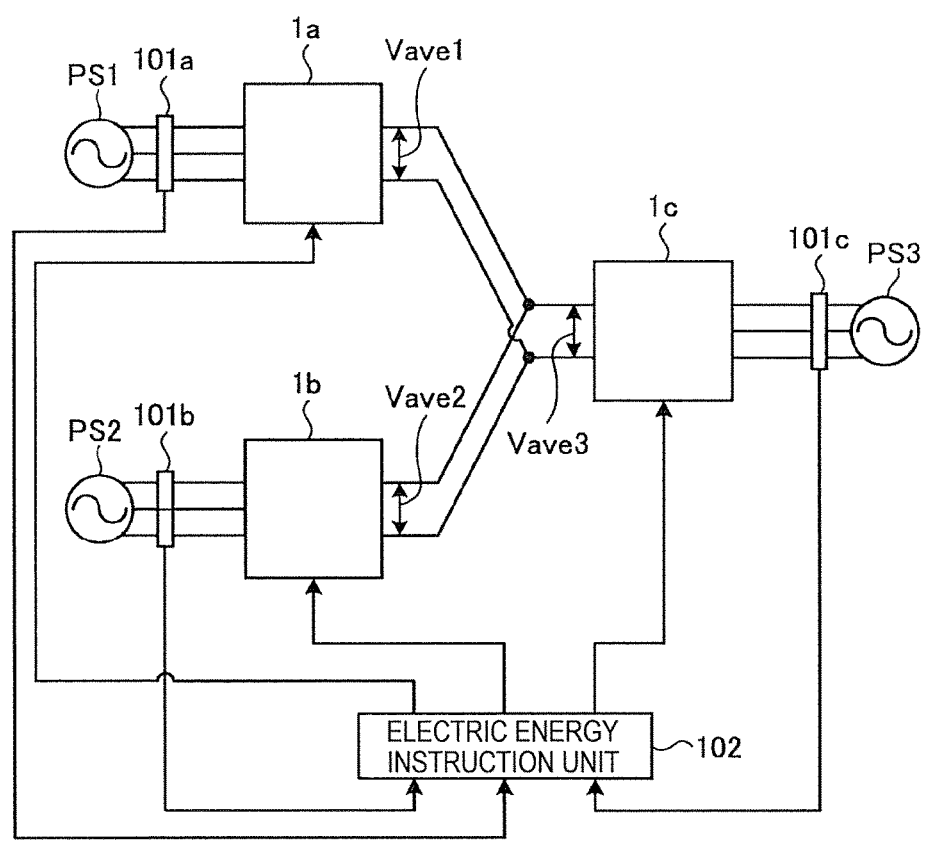

DC/AC SYSTEM INTERCONNECTION DEVICE AND AC/AC SYSTEM INTERCONNECTION DEVICE

CROSS REFERENCE

This application is the U.S. National Phase under 35 USC § 371 of International Application No. PCT/JP2016/059774, filed on Mar. 25, 2016, which claims the benefit of Japanese Application No. 2015-074050, filed on Mar. 31, 2015 and Japanese Application No. 2016-038044, filed on Feb. 29, 2016, the entire contents of each are hereby incorporated by reference.

TECHNICAL FIELD

The present invention relates to a DC/AC system interconnection device that can bidirectionally perform power conversion between DC power and AC power with a simple configuration and an AC/AC system interconnection device that can bidirectionally perform power conversion between pieces of AC power with a simple configuration.

BACKGROUND ART

In general, a DC/AC converter that performs bidirectional conversion between DC power and AC power is used in a three-phase full bridge using a switching element such as an IGBT. The three-phase full bridge is used as a PWM converter.

Meanwhile, in Patent Document 1, a device for driving a DC motor, to which, for example, a three-phase/three-phase matrix converter is applied, is disclosed as a device that performs conversion between AC power and DC power using a matrix converter. Specifically, two pieces of output of a general three-phase/three-phase matrix converter are supplied to an armature of the DC motor, and third output of the three-phase/three-phase matrix converter is connected to a field circuit of the DC motor and is additionally connected to each phase of an input power line via a diode to which a phase corresponds.

In addition, a power converter that directly converts to AC power, without converting AC power to DC power, is also known as a matrix converter, in general. In the matrix converter, a switching element that performs conversion is one stage. Consequently, efficiency can be enhanced compared to a power converter obtained by combining a converter and an inverter. Since there is no circuit that deals with a DC voltage, a smoothing capacitor is not requested, the life of a device can be extended, and reliability can be enhanced. For example, a matrix converter that directly converts input three-phase AC power to three-phase AC power and outputs to a load is disclosed in Patent Document 2.

CITATION LIST

Patent Citation

Patent Document 1: Japanese Laid-open Patent Publication No. 2003-88174
Patent Document 2: Japanese Laid-open Patent Publication No. 2014-143825

SUMMARY OF INVENTION

Technical Problem

Meanwhile, a DC voltage is requested to be higher than a system voltage in a PWM converter, which is adopted as a DC/AC converter. Accordingly, in a case where a DC voltage, such as a storage battery voltage, is higher than a system voltage, it is possible to convert the DC voltage to the system voltage, but in a case where a storage battery voltage is lower than a system voltage, the storage battery voltage is requested to be stepped up and a bidirectional DC-DC chopper for use of a higher DC of the PWM converter is requested to be connected. For this reason, in the DC/AC converter of the related art, a bidirectional DC-DC chopper is requested to be provided in the case of performing bidirectional power conversion, resulting in increased costs as the number of components increases.

Herein, there is a call for a device that can bidirectionally and directly perform power conversion between storage battery power and three-phase power using a matrix converter, but at this current point in time, the device is yet to be realized. That is, there is no device that can directly perform system interconnection between DC power and AC power using a matrix converter.

Meanwhile, the matrix converter disclosed in Patent Document 2 is a device that outputs converted three-phase AC power to a load side and is not a device that directly performs bidirectional power conversion between pieces of three-phase AC power. Herein, from substations, there is a call for a device that can realize system interconnection between three-phase AC power supplies, which have any frequency and voltage, with a simple configuration.

The invention is made in view of the above circumstances, and an object thereof is to provide a DC/AC system interconnection device that can bidirectionally perform power conversion between DC power and AC power with a simple configuration. In addition, another object of the invention is to provide an AC/AC system interconnection device that can bidirectionally perform power conversion between pieces of AC power with a simple configuration.

Solution to Problem

To solve the aforementioned problems and to achieve the objects, a DC/AC system interconnection device according to the invention is a DC/AC system interconnection device that can bidirectionally and directly perform power conversion between three-phase AC power and DC power. The DC/AC system interconnection device includes a bidirectional switch circuit that is provided between a three-phase AC power supply and a DC power supply and turns on and off power between the three-phase AC power supply and the DC power supply, a control unit that generates, in a predetermined switching cycle, a first carrier waveform pattern, which is has a pattern that varies for each mode, according to a plurality of modes divided according to a magnitude relation between voltages in each phase in the three-phase AC power, that performs virtual AC/DC conversion processing to acquire a plurality of interline voltage generation sections, in which two phases of the three-phase AC power are selected, based on the first carrier waveform pattern in the predetermined switching cycle and a first control signal corresponding to a phase of the three-phase AC power, that generates a second carrier waveform pattern, which varies according the plurality of modes, corresponding to the plurality of interline voltage generation sections acquired from the virtual AC/DC conversion processing, and that generates a switching pattern of the bidirectional switch circuit to perform virtual DC/DC conversion processing, which varies according to the plurality of modes, on a interline voltage across two phases selected from the plurality of interline voltage generation sections based on the generated second carrier waveform pattern and a second control signal corresponding to a phase of the DC power, a current setting unit that inputs a current set value indicating a current direction and an amount of current which flows between the DC power supply and the bidirectional switch circuit, a current detection unit that detects the current direction and the amount of current which flows between the DC power supply and the bidirectional switch circuit, and a current adjustment unit that generates the second control signal which increases and decreases a signal level such that the current direction and the amount of current detected by the current detection unit become the current set value.

In addition, according to the above invention, in the DC/AC system interconnection device according to the invention, the current adjustment unit makes an average DC voltage in the predetermined switching cycle generated from the virtual DC/DC conversion processing by the control unit larger than an interphase voltage of the DC power and generates the second control signal to adjust the amount of current based on a magnitude of a differential voltage between the interphase voltage of the DC power and the average DC voltage in a case where the three-phase AC power is converted to the DC power, and makes the average DC voltage smaller than the interphase voltage of the DC power and generates the second control signal to adjust the amperage based on the magnitude of the differential voltage between the interphase voltage of the DC power and the average DC voltage in a case where the DC power is converted to the three-phase AC power.

In addition, according to the above invention, the DC/AC system interconnection device according to the invention further includes an inverting unit that sets the second control signal to a positive second control signal and generates a negative second control signal obtained by inverting the positive second control signal in which a magnitude of the average DC voltage corresponds to a difference between a signal level of the positive second control signal and a signal level of the negative second control signal.

In addition, according to the above invention, in the DC/AC system interconnection device according to the invention, the control unit recognizes a maximum voltage phase, a minimum voltage phase, and an intermediate voltage phase in the three-phase AC power and acquires the plurality of interline voltage generation sections by being divided into a first section corresponding to the intermediate voltage phase and the minimum voltage phase, a second section corresponding to the maximum voltage phase and the minimum voltage phase, and a third section corresponding to the maximum voltage phase and the intermediate voltage phase.

In addition, according to the above invention, in the DC/AC system interconnection device according to the invention, the second carrier waveform pattern has a pattern of which a level changes in a chevron that straddles two consecutive sections out of the plurality of interline voltage generation sections.

In addition, according to the above invention, in the DC/AC system interconnection device according to the invention, when a voltage phase with a larger voltage value is set as a +side phase and a voltage phase with a smaller voltage value is set as a −side phase, out of two voltage phases in each of the plurality of interline voltage generation sections, the second carrier waveform pattern has a pattern of which a level is continuous in a chevron that straddles two interline voltage generation sections to be switched in a case where there is a phase common to +side phases or −side phases when switching between the interline voltage generation sections, and has a pattern of which a level changes in a serrated shape at a boundary between two interline voltage generation sections to be switched in a case where there is a phase, which is inverted between a +side phase and a −side phase, when switching between the interline voltage generation sections.

In addition, an AC/AC system interconnection device according to the invention performs power conversion between three-phase AC power supplies. The AC/AC system interconnection device includes a first bidirectional switch circuit that performs bidirectional power conversion between first three-phase AC power on a side of a first three-phase AC power supply and first DC power by switching, a second bidirectional switch circuit that performs bidirectional power conversion between second three-phase AC power on a side of a second three-phase AC power supply and second DC power by switching, a DC power line that is connected to the first bidirectional switch circuit and the second bidirectional switch circuit and performs power movement between the first DC power and the second DC power, a first control unit that controls switching of the first bidirectional switch circuit, a second control unit that controls switching of the second bidirectional switch circuit, an electric energy detection unit that detects a current direction and moving electric energy of a current which flows between the first bidirectional switch circuit and the second bidirectional switch circuit, and an electric energy instruction unit that instructs of electric energy which moves between the first three-phase AC power supply and the second three-phase AC power supply and a current direction, in which the first control unit generates a switching pattern of the first bidirectional switch circuit and the second control unit generates a switching pattern of the second bidirectional switch circuit such that the current direction detected by the electric energy detection unit and the detected electric energy become the current direction and electric energy instructed by the electric energy instruction unit.

In addition, according to the above invention, in the AC/AC system interconnection device according to the invention, the first control unit generates, in a predetermined switching cycle, a first carrier waveform pattern for the first bidirectional switch circuit, which has a pattern that varies for each mode, according to a plurality of modes divided according to a magnitude relation between voltages in each phase in the first three-phase AC power supply, performs virtual AC/DC conversion processing to acquire a plurality of interline voltage generation sections, in which two phases of the first three-phase AC power supply are selected, based on the first carrier waveform pattern for the first bidirectional switch circuit in the predetermined switching cycle and a first control signal for the first bidirectional switch circuit corresponding to a phase of the first three-phase AC power supply, generates a second carrier waveform pattern for the first bidirectional switch circuit, which varies according to the plurality of modes, corresponding to the plurality of interline voltage generation sections acquired from the virtual AC/DC conversion processing, and generates the switching pattern of the first bidirectional switch circuit to perform virtual DC/DC conversion processing, which varies according to the plurality of modes, on an interline voltage across two phases selected from the plurality of interline voltage generation sections based on the generated second carrier waveform pattern for the first bidirectional switch circuit and a second control signal for the first bidirectional switch circuit corresponding to a phase of the first DC power, and the second control unit generates, in a predetermined switching cycle, a first carrier waveform pattern for the second bidirectional switch circuit, which has a pattern that varies for each mode, according to a plurality of modes divided according to a magnitude relation between voltages in each phase in the second three-phase AC power supply, performs virtual AC/DC conversion processing to acquire a plurality of interline voltage generation sections, in which two phases of the second three-phase AC power supply are selected, based on the first carrier waveform pattern for the second bidirectional switch circuit in the predetermined switching cycle and a first control signal for the second bidirectional switch circuit corresponding to a phase of the second three-phase AC power supply, generates a second carrier waveform pattern for the second bidirectional switch circuit, which varies according to the plurality of modes, corresponding to the plurality of interline voltage generation sections acquired from the virtual AC/DC conversion processing, and generates a switching pattern of the second bidirectional switch circuit to perform virtual DC/DC conversion processing, which varies according to the plurality of modes, on an interline voltage across two phases selected from the plurality of interline voltage generation sections based on the generated second carrier waveform pattern for the second bidirectional switch circuit and a second control signal for the second bidirectional switch circuit corresponding to a phase of the second DC power.

In addition, in the above invention, the AC/AC system interconnection device according to the invention further includes a first voltage adjustment unit that generates the second control signal for the first bidirectional switch circuit to output to the first control unit based on the current direction and electric energy instructed by the electric energy instruction unit and the current direction and electric energy detected by the electric energy detection unit, and a second voltage adjustment unit that generates the second control signal for the second bidirectional switch circuit to output to the second control unit based on the current direction and electric energy instructed by the electric energy instruction unit and the current direction and electric energy detected by the electric energy detection unit, in which in a case where power movement from the first bidirectional switch circuit to the second bidirectional switch circuit is performed via the DC power line, the first voltage adjustment unit makes a first average DC voltage in the predetermined switching cycle generated from the virtual DC/DC conversion processing by the first control unit larger than a DC voltage according to the second DC power, and generates the second control signal for the first bidirectional switch circuit to adjust a voltage amount based on a magnitude of a differential voltage between a DC voltage according to the second DC power and the first average DC voltage, in a case of converting the first three-phase AC power to the first DC power, and/or the second voltage adjustment unit makes a second average DC voltage in the predetermined switching cycle generated from the virtual DC/DC conversion processing by the second control unit smaller than a DC voltage according to the first DC power, and generates the second control signal for the second bidirectional switch circuit to adjust the voltage amount according to a magnitude of a differential voltage between the DC voltage according to the first DC power and the second average DC voltage, in a case of converting the second three-phase AC power to the second DC power.

In addition, in the above invention, the AC/AC system interconnection device according to the invention further includes a first voltage adjustment unit that generates the second control signal for the first bidirectional switch circuit to output to the first control unit based on the current direction and electric energy instructed by the electric energy instruction unit and the current direction and electric energy detected by the electric energy detection unit, and a second voltage adjustment unit that generates the second control signal for the second bidirectional switch circuit to output to the second control unit based on the current direction and electric energy instructed by the electric energy instruction unit and the current direction and electric energy detected by the electric energy detection unit, in which in a case where power movement from the second bidirectional switch circuit to the first bidirectional switch circuit is performed via the DC power line, the first voltage adjustment unit makes a first average DC voltage in the predetermined switching cycle generated from the virtual DC/DC conversion processing by the first control unit smaller than a DC voltage according to the second DC power, and generates the second control signal for the first bidirectional switch circuit to adjust a voltage amount based on a magnitude of a differential voltage between a DC voltage according to the second DC power and the first average DC voltage, in a case of converting the first three-phase AC power to the first DC power, and/or the second voltage adjustment unit makes a second average DC voltage in the predetermined switching cycle generated from the virtual DC/DC conversion processing by the second control unit larger than a DC voltage according to the first DC power, and generates the second control signal for the second bidirectional switch circuit to adjust the voltage amount according to a magnitude of a differential voltage between the DC voltage according to the first DC power and the second average DC voltage, in a case of converting the second three-phase AC power to the second DC power.

Advantageous Effects of Invention

According to the DC/AC system interconnection device of the invention, a bidirectional booster is not requested to be provided and power conversion between DC power and AC power can be bidirectionally and directly performed with a simple configuration.

According to the AC/AC system interconnection device of the invention, bidirectional power conversion can be directly performed between three-phase AC power supplies, which have different frequencies and/or voltages, with a simple configuration.

BRIEF DESCRIPTION OF DRAWINGS

FIG. 1 is a block diagram illustrating a configuration that includes a DC/AC system interconnection device used in an AC/AC system interconnection device according to an embodiment of the invention.

FIG. 2 is a view illustrating an example of a configuration of a bidirectional switch illustrated in FIG. 1.

FIG. 3 is a view illustrating a relation between a current direction and an amount of current that flows in a P-line based on a magnitude relation between a P-N interphase voltage and an average DC voltage from virtual DC/DC conversion processing.

FIG. 4 is a view illustrating a plurality of modes recognized by a control unit illustrated in FIG. 1.

FIG. 5 is a time chart illustrating virtual AC/DC conversion processing and the virtual DC/DC conversion processing, which are performed by the control unit illustrated in FIG. 1, in a mode m1.

FIG. 6 is a time chart illustrating the virtual AC/DC conversion processing and the virtual DC/DC conversion processing, which are performed by the control unit illustrated in FIG. 1, in a mode m2.

FIG. 7 is a time chart illustrating the virtual AC/DC conversion processing and the virtual DC/DC conversion processing, which are performed by the control unit illustrated in FIG. 1, in a mode m3.

FIG. 8 is a time chart illustrating the virtual AC/DC conversion processing and the virtual DC/DC conversion processing, which are performed by the control unit illustrated in FIG. 1, in a mode m4.

FIG. 9 is a time chart illustrating the virtual AC/DC conversion processing and the virtual DC/DC conversion processing, which are performed by the control unit illustrated in FIG. 1, in a mode m5.

FIG. 10 is a time chart illustrating the virtual AC/DC conversion processing and the virtual DC/DC conversion processing, which are performed by the control unit illustrated in FIG. 1, in a mode m6.

FIG. 11 is a timing chart illustrating changes in a current and voltage of each portion in a case where power is supplied from a three-phase AC power supply side to a storage battery side.

FIG. 12 is a timing chart illustrating the changes in the current and voltage of each portion in a case where power is supplied from the storage battery side to the three-phase AC power supply side.

FIG. 13 is a block diagram illustrating a configuration of an AC/AC system linkage device according to the embodiment.

FIG. 14 is a time chart illustrating the virtual AC/DC conversion processing and the virtual DC/DC conversion processing, which are performed by a first control unit, in a mode m1.

FIG. 15 is a time chart illustrating the virtual AC/DC conversion processing and the virtual DC/DC conversion processing, which are performed by a second control unit, in a mode m1.

FIG. 16 is a view illustrating a relation between a current direction and an amount of current between DC/AC system interconnection devices based on a magnitude relation between an average DC voltage from virtual DC/DC conversion processing of one DC/AC system interconnection device (DC voltage according to first DC power) and an average DC voltage from virtual DC/DC conversion processing of the other DC/AC system interconnection device (DC voltage according to second DC power).

FIG. 17 is a block diagram illustrating an example in which three DC/AC system interconnection devices are connected to each other.

EMBODIMENTS FOR CARRYING OUT THE INVENTION

Hereinafter, an embodiment of the invention will be described with reference to the accompanying drawings.
(Overall Configuration of DC/AC System Interconnection Device)

FIG. 1 is a block diagram illustrating a configuration that includes a DC/AC system interconnection device 1 used in an AC/AC system interconnection device according to an embodiment of the invention. As illustrated in FIG. 1, three-phase AC power, including each of R-phase, S-phase, and T-phase, is input from a three-phase AC power supply PS (AC device) via power lines LR, LS, and LT into the DC/AC system interconnection device 1, and the DC/AC system interconnection device 1 directly converts the input three-phase AC power to DC power, instead of temporarily converting to DC power, and outputs the DC power to a storage battery LD (DC device) via power lines LU (P-line) and LV (N-line). In addition, conversely, the DC-AC system interconnection device 1 directly outputs DC power from the storage battery LD as AC power to a three-phase AC power supply PS side. That is, the DC/AC system interconnection device 1 bidirectionally and directly performs power conversion between three-phase AC power and storage battery power.

The DC/AC system interconnection device 1 has an input capacitor 40, a reactor 30, a bidirectional switch circuit 10, a control unit 20, a current detection unit 51, a current adjustment unit 52, and a current setting unit 50.

The input capacitor 40 has capacitors 41 to 43. One end of each of the capacitors 41 to 43 is connected to the R-phase, the S-phase, and the T-phase, respectively, and the other end of each of the capacitors 41 to 43 is commonly connected. The input capacitor 40 reduces ripples of a current and voltage of each phase.

The reactor 30 is disposed on the power line LU and reduces ripples.

The bidirectional switch circuit 10 turns on and off the supply of input three-phase AC power to the storage battery LD such that the input three-phase AC power is converted to DC power. In addition, the bidirectional switch circuit 10 turns on and off the supply of input DC power to the three-phase AC power supply PS such that the input DC power is converted to the three-phase AC power. The bidirectional switch circuit 10 has a bidirectional switch group SW. The bidirectional switch group SW has six bidirectional switches SRP, SSP, STP, SRN, SSN, and STN. The bidirectional switch circuit 10 converts input three-phase AC power to single-phase AC power by turning on and off the six bidirectional switches SRP, SSP, STP, SRN, SSN, and STN at each predetermined timing under the control of the control unit 20.

The bidirectional switch SRP turns on and off connection between the R-phase and the P-line. The bidirectional switch SSP turns on and off connection between the S-phase and the P-line. The bidirectional switch STP turns on and off connection between the T-phase and the P-line. The bidirectional switch SRN turns on and off connection between the R-phase and the N-line. The bidirectional switch SSN turns on and off connection between the S-phase and the N-line. The bidirectional switch STN turns on and off connection between the T-phase and the N-line.

Each of the bidirectional switches SRP, SSP, STP, SRN, SSN, and STN are equivalent to, for example, a switch S illustrated in FIG. 2(a). The switch S illustrated in FIG. 2(a) receives a switch signal via a control terminal CT from the control unit 20, connects a terminal T1 and a terminal T2 together by being turned on, and disconnects the terminal T1 from the terminal T2 by being turned off. The switch S can cause a current to bidirectionally flow between the terminal T1 and the terminal T2.

The switch S illustrated in FIG. 2(a) is an ideal switch. Since elements configuring a switch request switching time in practice, the elements may be configured so as to be connected, for example, as in FIG. 2(b) or FIG. 2(c) by taking into account an open mode and a short-circuit mode during commutation. The configuration illustrated in FIG. 2(b) is a configuration realized by connecting elements EL1 and EL2 together in parallel, which have, for example, a reverse current blocking function. The elements EL1 and EL2 having the reverse current blocking function may be, for example, insulated-gate bipolar transistors (IGBT). Terminals T1' and T2' correspond to terminals T1 and T2 illustrated in FIG. 2(a), respectively, and control terminals CT1' and CT2' correspond to the control terminal CT illustrated in FIG. 2(a).

Alternatively, the configuration illustrated in FIG. 2(c) is a configuration realized by connecting elements EL11 and EL12 together in series, which do not have, for example, a reverse current blocking function. The elements EL11 and EL12 which do not have the reverse current blocking function may be, for example, insulated-gate bipolar transistors (IGBT), of which both ends are connected to freewheeling diodes, or may be field-effect transistors (FET). A terminal T1" corresponds to the terminal T1 illustrated in FIG. 2(a). A terminal T2" corresponds to the terminal T2 illustrated in FIG. 2(a). Control terminals CT1" and CT2" correspond to the control terminal CT illustrated in FIG. 2(a).

The current setting unit 50 inputs a current set value indicating a current direction F or B and an amount of current A of a current that flows in the power line LU, as electric energy that moves between the three-phase AC power supply PS and the storage battery LD and a movement direction of power, into the current adjustment unit 52. The current detection unit 51 detects the current direction F or B and an amount of current A1 of the current that flows in the power line LU and inputs the detection results into the current adjustment unit 52. The current adjustment unit 52 outputs a signal level G1, which is a second control signal, to the control unit 20 such that the current direction F or B and the amount of current A1 detected by the current detection unit 51 become the current set value input from the current setting unit 50.

(Processing Outline of Control Unit)

The control unit 20 generates a switching pattern of the bidirectional switch group SW in the bidirectional switch circuit 10. The control unit 20 performs virtual AC/DC conversion processing with respect to three-phase AC power input in the bidirectional switch circuit 10, and generates a switching pattern of the bidirectional switch circuit 10 (that is, a pattern of the switch signal) such that virtual DC/DC conversion processing is performed with respect to the power on which the virtual AC/DC conversion processing is performed. In the following, "performing virtual AC/DC conversion processing" means virtually performing virtual AC/DC conversion processing, and "performing virtual DC/DC conversion processing" means virtually performing virtual DC/DC conversion processing.

The control unit 20 generates a switching pattern of the bidirectional switch circuit 10 such that different types of virtual AC/DC conversion processing are performed with respect to input three-phase AC power for a plurality of modes (for example, modes m1 to m6 illustrated in FIG. 4), which are divided according to a magnitude relation between voltages of each phase in the input three-phase AC power. Herein, the mode m1 is a phase section of 0° to 60° with time when an R-phase voltage is a maximum value (or time when an S-phase voltage intersects a T-phase voltage) as a starting point (0°). Similarly, the modes m2 to m6 are phase sections of 60° to 120°, 120° to 180°, 180° to 240°, 240° to 300°, and 300° to 360°, respectively.

The control unit 20 has a synchronization signal detection unit 21. The synchronization signal detection unit 21 detects an intersection point at which a voltage difference between the S-phase and the T-phase becomes 0, estimates an AC voltage of each phase (the R-phase, the S-phase, and the T-phase) on an input side as a first control signal with a phase of the intersection point as 0°, and recognizes which mode is the mode of that time, among the plurality of modes m1 to m6, according to a magnitude relation between estimated AC voltages of each phase.

The control unit 20 has a first carrier waveform pattern generating unit 22. The first carrier waveform pattern generating unit 22 repeatedly generates first carrier waveform patterns, which vary according to the plurality of modes m1 to m6, such as first carrier waveform patterns CW11 to CW13 illustrated in FIG. 5 to FIG. 10, with respect to input three-phase AC power for each switching cycle T. That is, the first carrier waveform pattern generating unit 22 determines the first carrier waveform patterns CW11 to CW13 to be used in virtual AC/DC conversion processing for each switching cycle T according to the modes m1 to m6 recognized by the synchronization signal detection unit 21. The switching cycle T is, for example, approximately 100 µs.

The control unit 20 has a phase information generating unit 23. As illustrated in FIG. 5(a), the phase information generating unit 23 compares the first carrier waveform patterns CW11 to CW13 determined by the first carrier waveform pattern generating unit 22 with the first control signal that corresponds to a phase on the input side, and generates a plurality of virtual switch signals (the R-phase pulse, the S-phase pulse, and the T-phase pulse) for each of the bidirectional switches SRP to STN to virtually generate DC power according to the comparison results. Along with this, the phase information generating unit 23 acquires a plurality of interline voltage generation sections φTS (for example, sections TS11, TS12, and TS13 in the mode m1 illustrated in FIG. 5(d)) according to a combination of levels (high and low) of the plurality of virtual switch signals (the R-phase pulse, the S-phase pulse, and the T-phase pulse). In addition, the phase information generating unit 23 acquires a selected+side phase and −side phase in the interline voltage generation section φTS. The phase information generating unit 23 acquires the plurality of interline voltage generation sections φTS such that averages of selected-two-interphase voltages in the switching cycle T obtained in each of the modes m1 to m6 become equal. In other words, as will be described later, the phase information generating unit 23 virtually performs AC/DC conversion processing (virtual AC/DC conversion processing) on each of the bidirectional switches SRP to STN such that each of the bidirectional switches SRP to STN perform virtual switching operation to generate DC power.

To consider virtual DC power generation in a midway stage of virtual AC/DC conversion→virtual DC/DC conversion, virtual switching operation is switching operation regarded as operation virtually performed by each of the bidirectional switches SRP to STN although the virtual switching operation is switching operation different from operation actually performed by each of the bidirectional switches SRP to STN. Processing of generating virtual DC power in the midway stage is no more than virtual processing, and the processing itself is not actually performed.

In addition, the control unit 20 controls a switching pattern of the bidirectional switch circuit 10 (that is, a pattern of the switch signal) such that different types of virtual DC/DC conversion processing for the plurality of modes m1 to m6 are performed with respect to power on which the virtual AC/DC conversion processing is performed.

Specifically, the control unit 20 has a second carrier waveform pattern generating unit 24. The second carrier waveform pattern generating unit 24 generates second carrier waveform patterns (for example, second carrier waveform patterns CW21 to CW26 illustrated in FIG. 5 to FIG. 10), which vary according to the plurality of modes m1 to m6 recognized by the synchronization signal detection unit 21. The control unit 20 controls the bidirectional switch circuit 10 such that the virtual DC/DC conversion processing is performed using the second carrier waveform patterns CW21 to CW26. That is, the control unit 20 generates the second carrier waveform patterns CW21 to CW26 that correspond to the plurality of interline voltage generation sections φTS used in virtual DC/DC conversion processing according to the recognized modes m1 to m6. The second carrier waveform patterns CW21 to CW26 are also repeatedly generated in the switching cycles T within the same mode. At this time, the plurality of interline voltage generation sections φTS are sections according to a combination of levels of the plurality of virtual switch signals. In brief, the control unit 20 generates the second carrier waveform patterns CW21 to CW26 according to a recognized mode and a combination of levels of the plurality of switch signals for each of the bidirectional switches SRP to STN to virtually generate DC power.

Herein, the control unit 20 inputs the input signal level G1 of the P-line into a −side of a P-line comparator CP. In addition, an inverter 27 inverts the signal level G1 of the P-line, and inputs an inverted signal level G2 of the N-line into a −side of an N-line comparator CN. A second carrier waveform pattern CW2 (CW21 to CW26) generated by the second carrier waveform pattern generating unit 24 is input into each of +sides of the P-line comparator CP and the N-line comparator CN.

The P-line comparator CP compares the signal level G1 of the P-line with the second carrier waveform pattern CW2, and outputs the comparison results to a switch control unit 28. Meanwhile, the N-line comparator CN compares the signal level G2 of the N-line with the second carrier waveform pattern CW2, and outputs the comparison results to the switch control unit 28. The switch control unit 28 PWM-controls a selected-two-interphase voltage obtained from the R-phase pulse, S-phase pulse, and T-phase pulse of the interline voltage generation section φTS based on the comparison results from the P-line comparator CP, and generates switch signals φSRP, φSSP, and φSTP to switch on and off the bidirectional switches SRP, SSP, and STP connected to the P-line. In addition, the switch control unit 28 PWM-controls a selected-two-interphase voltage of the interline voltage generation section φTS based on the comparison results from the N-line comparator CN, and generates switch signals φSRN, φSSN, and φSTN to switch on and off the bidirectional switches SRN, SSN, and STN connected to the N-line. A P-N interline voltage is a voltage between the P-line and the N-line generated for each switching cycle T in the control unit 20.

As illustrated in FIG. 3, the current adjustment unit 52 makes an average DC voltage Vave (for example, an average of P-N interline voltages of FIG. 5(h)) of voltages P1, P2, and P3 in the switching cycle T, which are generated from virtual DC/DC conversion processing by the control unit 20, larger than a P-N interphase voltage Vb of the storage battery LD (refer to FIG. 1), and generates the signal level G1 (second control signal) to set an amount proportional to a differential voltage between the P-N interphase voltage Vb on the storage battery LD side and the average DC voltage Vave of the P-N interline voltages as an amount of current, in the case of the current direction (F), which is from the three-phase AC power supply PS to a storage battery LD side. The current adjustment unit 52 makes the average DC voltage Vave of the P-N interline voltages smaller than the P-N interphase voltage Vb on the storage battery LD side, and generates the signal level G1 (second control signal) to set an amount proportional to a differential voltage between the P-N interphase voltage Vb on the storage battery LD side and the average DC voltage Vave of the P-N interline voltages as an amount of current, in the case of the current direction (B), which is from the storage battery LD side to the three-phase AC power supply PS side.

That is, the current adjustment unit 52 adjusts electric energy that moves between the three-phase AC power supply PS and the storage battery LD and the movement direction of power. Specifically, the current direction (F or B) changes according to whether to make the average DC voltage Vave larger or smaller than the P-N interphase voltage Vb, and the amount of current A is adjusted according to the magnitude (absolute value) of the differential voltage.

(Description of Mode)

Herein, the plurality of modes m1 to m6 recognized by the synchronization signal detection unit 21 will be described with reference to FIG. 4.

The synchronization signal detection unit 21 recognizes the six modes m1 to m6 illustrated in FIG. 4 according to a magnitude relation between detected AC voltages of each phase (the R-phase, the S-phase, and the T-phase).

In the mode m1, the R-phase is the maximum voltage phase, the T-phase is the minimum voltage phase, and the S-phase is the intermediate voltage phase. For example, the synchronization signal detection unit 21 recognizes that the current mode is the mode m1 in a case where it is recognized that the R-phase is the maximum voltage phase, the T-phase is the minimum voltage phase, and the S-phase is the intermediate voltage phase.

In the mode m2, the S-phase is the maximum voltage phase, the T-phase is the minimum voltage phase, and the R-phase is the intermediate voltage phase. For example, the synchronization signal detection unit 21 recognizes that the current mode is the mode m2 in a case where it is recognized that the S-phase is the maximum voltage phase, the T-phase is the minimum voltage phase, and the R-phase is the intermediate voltage phase.

In the mode m3, the S-phase is the maximum voltage phase, the R-phase is the minimum voltage phase, and the T-phase is the intermediate voltage phase. For example, the synchronization signal detection unit 21 recognizes that the current mode is the mode m3 in a case where it is recognized that the S-phase is the maximum voltage phase, the R-phase is the minimum voltage phase, and the T-phase is the intermediate voltage phase.

In the mode m4, the T-phase is the maximum voltage phase, the R-phase is the minimum voltage phase, and the S-phase is the intermediate voltage phase. For example, the synchronization signal detection unit 21 recognizes that the current mode is the mode m4 in a case where it is recognized that the T-phase is the maximum voltage phase, the R-phase is the minimum voltage phase, and the S-phase is the intermediate voltage phase.

In the mode m5, the T-phase is the maximum voltage phase, the S-phase is the minimum voltage phase, and the R-phase is the intermediate voltage phase. For example, the synchronization signal detection unit 21 recognizes that the current mode is the mode m5 in a case where it is recognized that the T-phase is the maximum voltage phase, the S-phase is the minimum voltage phase, and the R-phase is the intermediate voltage phase.

In the mode m6, the R-phase is the maximum voltage phase, the S-phase is the minimum voltage phase, and the T-phase is the intermediate voltage phase. For example, the synchronization signal detection unit 21 recognizes that the current mode is the mode m6 in a case where it is recognized that the R-phase is the maximum voltage phase, the S-phase is the minimum voltage phase, and the T-phase is the intermediate voltage phase.

The synchronization signal detection unit 21 may recognize each of the modes m1 to m6 with the initiation time point of the mode m1, which is a point when a detected voltage of the R-phase becomes a maximum, as a reference.

(Specific Virtual AC/DC Conversion Processing)

Next, virtual AC/DC conversion processing in each of the plurality of modes m1 to m6 will be described with reference to FIG. 5 to FIG. 10. FIG. 5 to FIG. 10 illustrate the two consecutive switching cycles T in each of the modes m1 to m6. Hereinafter, for simplicity of description, a case where a DC voltage setting gain which is determined according to the signal level G1 is 1 will be illustratively described.

[Mode m1]

In the mode m1, as illustrated in FIG. 5(a), the first carrier waveform pattern generating unit 22 determines the first carrier waveform pattern CW11 that has a descending saw-tooth wave W11 and an ascending saw-tooth wave W12 as a first carrier waveform pattern CW1 to be used in virtual AC/DC conversion processing. The "descending saw-tooth wave" refers to a saw-tooth wave with a negative slope of which an amplitude linearly decreases with time, and the "ascending saw-tooth wave" refers to a saw-tooth wave with a positive slope of which an amplitude linearly increases with time.

Meanwhile, an R-phase voltage a, an S-phase voltage b, and a T-phase voltage c directly detected by the synchronization signal detection unit 21 are input into the phase information generating unit 23. Alternatively, the phase information generating unit 23 estimates the R-phase voltage a, the S-phase voltage b, and the T-phase voltage c with the initiation time point of the mode m1, which is a point when a detected voltage becomes a maximum, as a reference. The R-phase voltage a, the S-phase voltage b, and the T-phase voltage c are acquired for each switching cycle T, and change with the passage of the switching cycle T. FIG. 5 illustrates a case where the R-phase voltage a, the S-phase voltage b, and the T-phase voltage c are in the adjacent switching cycle T. Herein, each of the input or estimated R-phase voltage a, S-phase voltage b, and T-phase voltage c are obtained by standardizing phase voltages so as to be voltages between "−1" and "1". At this time, DC voltages at sections (interline voltage generation sections) TS11, TS12, and TS13 illustrated in FIG. 5(d) satisfy S-T voltage=b−c, R-T voltage=a −c, and R-S voltage=a−b, respectively.

A pulse of each phase in the mode m1 will be described with reference to FIGS. 5(a) and (b). In the mode m1, the R-phase is the maximum voltage phase, the T-phase is the minimum voltage phase, and the S-phase is the intermediate voltage phase. In the maximum voltage phase and the minimum voltage phase, a pulse is turned on for time proportional to an electric potential thereof. Accordingly, R-phase pulse width x=T|a| and T-phase pulse width z=T|c| are satisfied. Herein, a timing when the R-phase pulse is turned on (timing when the section TS11 ends) is acquired from an intersection between the R-phase voltage |a| and the saw-tooth wave W11. The R-phase pulse is turned on when the R-phase voltage |a| is equal to or larger than a value of the saw-tooth wave W11. Consequently, the R-phase pulse is obtained. A timing when the T-phase pulse is turned off (timing when the section TS12, which is after the section TS11, ends) is acquired from an intersection between the T-phase voltage |c| and the saw-tooth wave W12. The T-phase pulse is turned on when the T-phase voltage |c| is equal to or larger than a value of the saw-tooth wave W12. Consequently, the T-phase pulse is obtained. An intermediate phase pulse is turned on when one of pulses in the maximum voltage phase or the minimum voltage phase is turned off. Accordingly, the S-phase pulse is acquired from the intersection between the R-phase voltage |a| and the saw-tooth wave W11 and the intersection between the T-phase voltage |c| and the saw-tooth wave W12.

Herein, the widths of the interline voltage generation sections TS11, TS12, and TS13 satisfy T×(1−|a|), T×(|a|+|c|−1), and T×(1−|c|), respectively. That is, the plurality of virtual switch signals (the R-phase pulse, the S-phase pulse, and the T-phase pulse), each of which have widths corresponding to the interline voltage generation sections TS11, TS12, and TS13, for generating virtual DC voltages are generated in virtual AC/DC conversion processing.

In addition, the DC voltage (the selected-two-interphase voltage illustrated in FIG. 5(c)) in the interline voltage generation sections TS11, TS12, and TS13 in virtual AC/DC conversion processing satisfies S-T voltage=b−c, R-T voltage=a−c, and R-S voltage=a−b, respectively. When a voltage phase at a high level is set as a +side phase and a voltage phase at a low level is set as a −side phase out of two voltage phases of a selected-two-interphase voltage, each of the S-phase, the R-phase, and the R-phase are +side phases and each of the T-phase, the T-phase, and the S-phase are −side phases in the interline voltage generation sections TS11, TS12, and TS13. The phase information generating unit 23 outputs the interline voltage generation section ϕTS (TS11, TS12, and TS13) to the second carrier waveform pattern generating unit 24 and the switch control unit 28 and outputs the +side phases and the −side phases to the switch control unit 28, in real time.

Meanwhile, an average of DC voltages in the switching cycle T can be expressed as the following equation (1), in which the DC voltages are integrated for each of the interline voltage generation sections TS11, TS12, and TS13, each of the integrated values are added together, and the added value is divided by the switching cycle T.

Average of DC voltages in the switching cycle $T=$
$\{(b-c) \times T \times (1-a) + (a-c) \times T \times (a-c-1) + (a-b) \times T \times (1+c)\}/T = a^2 + c^2 - b(a+c)$ (1)

Herein, the equation (1) can be altered to the following equation (2) when a+b+c=0 (three-phase condition) is taken into account.

Average of DC voltages in the switching cycle
$T = a^2 + b^2 + c^2$ (2)

Furthermore, according to the AC theory, the equation (2) can be altered to the following equation (3), which is derived based on $a^2+b^2+c^2=3/2$.

Average of DC voltages in the switching cycle
$T = 3/2$ (3)

As shown in the equation (3), an average of virtual DC voltages in the switching cycle T can be set to a constant voltage.

An input current in the mode m1 will be described. A positive current proportional to time of the R-phase voltage a flows as an input current of the R-phase. A negative current proportional to the magnitude of the voltage of the T-phase |c| flows as an input current of the T-phase. As an input current of the S-phase, a positive current flows in the interline voltage generation section TS11 and a negative current flows in the interline voltage generation section TS13. Accordingly, a flowing current satisfies T×(1−a)−T×(1+c)=T(−a−c)=Tb, and when the flowing current is divided by the switching cycle T, the S-phase voltage b is acquired. Accordingly, currents proportional to the R-phase voltage a, the S-phase voltage b, and the T-phase voltage c, respectively, flow in the R-phase, the S-phase, and the T-phase, and an input AC current of each phase can be a sinusoidal wave.

[Mode m2]

In the mode m2, as illustrated in FIG. 6(a), the first carrier waveform pattern generating unit 22 determines the first carrier waveform pattern CW12 that has the ascending saw-tooth wave W12 as a first carrier waveform pattern CW1 to be used in virtual AC/DC conversion processing. The phase information generating unit 23 acquires or estimates the R-phase voltage a, the S-phase voltage b, and the T-phase voltage c according to detection results of the synchronization signal detection unit 21. At this time, DC voltages in interline voltage generation sections TS21, TS22, and TS23 illustrated in FIG. 6(d) satisfy S-T voltage=b−c, R-T voltage=a−c, and R-S voltage=b−a, respectively.

A pulse of each phase in the mode m2 will be described with reference to FIGS. 6(a) and (b). In the mode m2, the S-phase is the maximum voltage phase, the T-phase is the minimum voltage phase, and the R-phase is the intermediate voltage phase. Since a pulse is turned on for time proportional to an electric potential thereof in the maximum voltage phase and the minimum voltage phase without changing the order of on and off of R-, S-, and T-phase pulses, the phase information generating unit 23 generates on and off timings of each phase pulse illustrated in FIG. 6(b) using the T-phase voltage |c|, a voltage (|b|+|c|−1), and the saw-tooth wave W12 in the mode m2.

Herein, the widths of the interline voltage generation sections TS21, TS22, and TS23 satisfy T×(|b|+|c|−1), T×(1−|b|), and T×(1−|c|), respectively. That is, the plurality of virtual switch signals (the R-phase pulse, the S-phase pulse, and the T-phase pulse), each of which have widths corresponding to the interline voltage generation sections TS21, TS22, and TS23, for generating virtual DC voltages are generated in virtual AC/DC conversion processing.

Herein, a DC voltage (selected-two-interphase voltage illustrated in FIG. 6(c)) in the interline voltage generation sections TS21, TS22, and TS23 in virtual AC/DC conversion processing satisfies S-T voltage=b−c, R-T voltage=a−c, and S-R voltage=b−a, respectively. When a voltage phase at a high level is set as a +side phase and a voltage phase at a low level is set as a −side phase out of two voltage phases of a selected-two-interphase voltage, each of the S-phase, the R-phase, and the S-phase are +side phases and each of the T-phase, the T-phase, and the R-phase are −side phases in the interline voltage generation sections TS21, TS22, and TS23. The phase information generating unit 23 outputs the interline voltage generation section ϕDTS (TS21, TS22, and TS23) to the second carrier waveform pattern generating unit 24 and the switch control unit 28 and outputs the +side phases and the −side phases to the switch control unit 28, in real time.

Meanwhile, an average of DC voltages in the switching cycle T in the mode m2 can be expressed as the following equation (4).

Average of DC voltages in the switching cycle $T=$
$\{(b-c) \times T(-c+b-1)+(a-c) \times T \times (-b+1)+(b-a) \times T \times (1+c)\}/T=b^2+c^2-a(b+c)$ (4)

Herein, the equation (4) can be altered to the following equation (5) when a+b+c=0 (three-phase condition) is taken into account.

Average of DC voltages in the switching cycle
$T=a^2+b^2+c^2$ (5)

Furthermore, according to the AC theory, the equation (5) can be altered to the following equation (6), which is derived based on $a^2+b^2+c^2=3/2$.

Average of DC voltages in the switching cycle
$T=3/2$ (6)

As shown in the equation (6), an average of virtual DC voltages in the switching cycle T can be set to a constant voltage.

An input current in the mode m2 will be described. In the mode m2, a positive current proportional to time of the S-phase voltage b flows in the S-phase and a negative current proportional to time of the T-phase voltage c flows in the T-phase since the S-phase is the maximum voltage phase and the T-phase is the minimum voltage phase. In the R-phase, a negative current flows in the interline voltage generation section TS22 and a positive current flows in the interline voltage generation section TS23. For this reason, a flowing current satisfies T×(1−b)−T×(1+c)=Ta, and when the flowing current is divided by the switching cycle T, the R-phase voltage a is acquired. Accordingly, a current proportional to a voltage flows in each phase and an input AC current in each phase can be a sinusoidal wave.

[Mode m3]

In the mode m3, as illustrated in FIG. 7(a), the first carrier waveform pattern generating unit 22 determines the first carrier waveform pattern CW13 that has the descending saw-tooth wave W11 as a first carrier waveform pattern to be used in virtual AC/DC conversion processing. The phase information generating unit 23 acquires or estimates the R-phase voltage a, the S-phase voltage b, and the T-phase voltage c according to detection results of the synchronization signal detection unit 21. At this time, DC voltages in interline voltage generation sections TS31, TS32, and TS33, illustrated in FIG. 7(d) satisfy S-T voltage=c−b, R-T voltage=a−c, and R-S voltage=a−b, respectively.

A pulse of each phase in the mode m3 will be described with reference to FIGS. 7(a) and (b). In the mode m3, the S-phase is the maximum voltage phase, the R-phase is the minimum voltage phase, and the T-phase is the intermediate voltage phase. Since a pulse is turned on for time proportional to an electric potential thereof in the maximum voltage phase and the minimum voltage phase without the order of on and off of R-, S-, and T-phase pulses being changed, on and off timings of each phase pulse illustrated in FIG. 7(b) are generated using the R-phase voltage |a|, a voltage (|a|+|b|−1), and the saw-tooth wave W11 in the mode m3.

Herein, the widths of the interline voltage generation sections TS31, TS32, and TS33 satisfy T×(1−|a|), T(1−|b|), and T×(|a|+|b|−1), respectively. That is, the plurality of virtual switch signals (the R-phase pulse, the S-phase pulse, and the T-phase pulse), each of which have widths corresponding to the interline voltage generation sections TS31, TS32, and TS33, for generating virtual DC voltages are generated in virtual AC/DC conversion processing.

Herein, a DC voltage (selected-two-interphase voltage illustrated in FIG. 7(c)) in the interline voltage generation sections TS31, TS32, and TS33 in the virtual AC/DC conversion processing satisfies S-T voltage=b−c, T-R voltage=c−a, and S-R voltage=b−a, respectively. When a voltage phase at a high level is set as a +side phase and a voltage phase at a low level is set as a −side phase out of two voltage phases of a selected-two-interphase voltage, each of the S-phase, the T-phase, and the S-phase are +side phases and each of the T-phase, the R-phase, and the R-phase are −side phases in the interline voltage generation sections TS31, TS32, and TS33. The phase information generating unit 23 outputs the interline voltage generation section φTS (TS31, TS32, and TS33) to the second carrier waveform pattern generating unit 24 and the switch control unit 28 and outputs the +side phases and the −side phases to the switch control unit 28, in real time.

Meanwhile, an average of DC voltages in the switching cycle T in the mode m3 can be expressed as the following equation (7).

$$\text{Average of DC voltages in the switching cycle } T = \{(b-c) \times T \times (1+a) + (-a+c) \times T \times (1-b) + (-a+b) \times T \times (-a+b-1)\}/T = a^2 + b^2 - c(a+b) \quad (7)$$

Herein, the equation (7) can be altered to the following equation (8) when a+b+c=0 (three-phase condition) is taken into account.

$$\text{Average of DC voltages in the switching cycle } T = a^2 + b^2 c^2 \quad (8)$$

Furthermore, according to the AC theory, the equation (8) can be altered to the following equation (9), which is derived based on $a^2 + b^2 c^2 = 3/2$.

$$\text{Average of DC voltages in the switching cycle } T = 3/2 \quad (9)$$

As shown in the equation (9), an average of virtual DC voltages in the switching cycle T can be set to a constant voltage.

An input current in the mode m3 will be described. A positive current proportional to time of the S-phase voltage b flows in the S-phase, which is the maximum voltage phase. A negative current proportional to time of the R-phase voltage a flows in the R-phase, which is the minimum voltage phase. In the T-phase, a negative current flows in the interline voltage generation section TS31 and a positive current flows in the interline voltage generation section TS32. For this reason, a flowing current satisfies T×(1−b)−T×(1+a)=Tc, and when the flowing current is divided by the switching cycle T, the T-phase voltage c is acquired. Accordingly, a current proportional to a voltage flows in each phase and an input AC current in each phase can be a sinusoidal wave.

[Modes m4 to m6]

As illustrated in FIG. 8, virtual AC/DC conversion processing in the mode m4 is the same as the virtual AC/DC conversion processing in the mode m1 (refer to FIG. 5). Interline voltage generation sections TS41, TS42, and TS43 are also acquired in the same manner as in the mode m1. Each of the T-phase, the T-phase, and the S-phase are +side phases and each of the S-phase, the R-phase, and the R-phase are −side phases in the interline voltage generation sections TS41, TS42, and TS43.

As illustrated in FIG. 9, virtual AC/DC conversion processing in the mode m5 is the same as the virtual AC/DC conversion processing in the mode m2 (refer to FIG. 6). Interline voltage generation sections TS51, TS52, and TS53 are also acquired in the same manner as in the mode m2. Each of the T-phase, the T-phase, and the R-phase are +side phases and each of the S-phase, the R-phase, and the S-phase are −side phases in the interline voltage generation sections TS51, TS52, and TS53.

As illustrated in FIG. 10, virtual AC/DC conversion processing in the mode m6 is the same as the virtual AC/DC conversion processing in the mode m3 (refer to FIG. 7). Interline voltage generation sections TS61, TS62, and TS63 are also acquired in the same manner as in the mode m3. Each of the T-phase, the R-phase, and the R-phase are +side phases and each of the S-phase, the T-phase, and the S-phase are −side phases in the interline voltage generation sections TS61, TS62, and TS63.

(Specific Virtual DC/DC Conversion Processing)

Next, virtual DC/DC conversion processing in each of the plurality of modes m1 to m6 will be described with reference to FIG. 5 to FIG. 10. First, as illustrated in FIGS. 5(e) and (f) to FIGS. 10(e) and (f), the second carrier waveform pattern generating unit 24 generates the second carrier waveform pattern CW2 (CW21 to CW26) corresponding to the modes m1 to m6. The second carrier waveform pattern CW2 is determined so as to be a pattern of which a level changes in a chevron that straddles two consecutive interline voltage generation sections out of the plurality of interline voltage generation sections φTS. In addition, the second carrier waveform pattern CW2 is determined so as to be a pattern of which a level is continuous in a chevron that straddles two consecutive interline voltage generation sections to be switched in a case where there is a phase common to +side phases or −side phases when switching between the plurality of interline voltage generation sections φTS, and a pattern of which a level changes in a serrated shape at a boundary between two interline voltage generation sections φTS to be switched in a case where there is a phase, which is inverted between the +side phase and the −side phase, when switching between the interline voltage generation sections φTS.

[Mode m1]

In the mode m1, as illustrated in FIGS. 5(e) and (f), the second carrier waveform pattern generating unit 24 determines the second carrier waveform pattern CW21 that has an ascending saw-tooth wave, a descending saw-tooth wave, and an ascending saw-tooth wave in the interline voltage generation sections TS11, TS12, and TS13 in this order as a second carrier waveform pattern CW2 to be used in virtual DC/DC conversion processing.

[Switching of Bidirectional Switches SRP, SSP, and STP]

The P-line comparator CP compares the second carrier waveform pattern CW21 with the signal level G1 of the P-line. The switch control unit 28 controls the switching of the bidirectional switches SRP, SSP, and STP connected to the P-line based on the comparison results from the P-line comparator CP. The switching of the bidirectional switches SRP, SSP, and STP equals PWM-controlling of each of the R-phase pulse, the S-phase pulse, and the T-phase pulse with respect to a voltage of the P-line. As illustrated in FIG. 5(e), the switch control unit 28 selects a +side phase, based on the comparison results from the P-line comparator CP, in the interline voltage generation section TS11 between time points t1 and t12 at which the signal level G1 of the P-line is higher than the second carrier waveform pattern CW21, that is, the S-phase, sets the switch signal SSP to an on-level, and sets the other switch signals φSRP and φSTP connected to the P-line to an off-level. Meanwhile, the switch control unit 28 selects a −side phase, based on the comparison results from the P-line comparator CP, in the interline voltage generation section TS11 between time points t12 and t13 at which the signal level G1 of the P-line is lower than the second carrier waveform pattern CW21, that is, the T-phase, and sets the switch signal φSTP to an on-level, and sets the other switch signals φSRP and SSP connected to the P-line to an off-level.

Similarly, the switch control unit 28 selects a +side phase, based on the comparison results from the P-line comparator CP, in the interline voltage generation section TS12 in a case where the signal level G1 of the P-line is higher than the second carrier waveform pattern CW21, that is, the R-phase, and sets the switch signal φSRP to an on-level, and sets the other switch signals SSP and φSTP connected to the P-line to an off-level. Meanwhile, the switch control unit 28 selects a −side phase, based on the comparison results from the P-line comparator CP, in the interline voltage generation section TS12 in a case where the signal level G1 of the P-line is lower than the second carrier waveform pattern CW21, that is, the T-phase, and sets the switch signal φSTP to an on-level, and sets the other switch signals φSRP and SSP connected to the P-line to an off-level.

Furthermore, the switch control unit 28 selects a +side phase, based on the comparison results from the P-line comparator CP, in the interline voltage generation section TS13 in a case where the signal level G1 of the P-line is higher than the second carrier waveform pattern CW21, that is, the R-phase, and sets the switch signal φSRP to an on-level, and sets the other switch signals SSP and φSTP connected to the P-line to an off-level. Meanwhile, the switch control unit 28 selects a −side phase, based on the comparison results from the P-line comparator CP, in the interline voltage generation section TS13 in a case where the signal level G1 of the P-line is lower than the second carrier waveform pattern CW21, that is, the S-phase, and sets the switch signal φSSP to an on-level, and sets the other switch signals φSRP and φSTP connected to the P-line to an off-level.

[Switching of Bidirectional Switches SRN, SSN, and STN]

Meanwhile, the N-line comparator CN compares the second carrier waveform pattern CW21 with the signal level G2 of the N-line. The switch control unit 28 controls the switching of the bidirectional switches SRN, SSN, and STN connected to the N-line based on the comparison results from the N-line comparator CN. The switching of the bidirectional switches SRN, SSN, and STN equals PWM-controlling of each of the R-phase pulse, the S-phase pulse, and the T-phase pulse with respect to a voltage of the N-line. As illustrated in FIG. 5(f), the switch control unit 28 selects a +side phase, based on the comparison results from the N-line comparator CN, in the interline voltage generation section TS11 between time points t1 and t11 at which the signal level G2 of the N-line is higher than the second carrier waveform pattern CW21, that is, the S-phase, sets the switch signal φSSN to an on-level, and sets the other switch signals φSRN and φSTN connected to the N-line to an off-level. Meanwhile, the switch control unit 28 selects a −side phase, based on the comparison results from the N-line comparator CN, in the interline voltage generation section TS11 between time points t11 and t13 at which the signal level G2 of the N-line is lower than the second carrier waveform pattern CW21, that is, the T-phase, and sets the switch signal φSTN to an on-level, and sets the other switch signals φSRN and φSSN connected to the N-line to an off-level.

Similarly, the switch control unit 28 selects a +side phase, based on the comparison results from the N-line comparator CN, in the interline voltage generation section TS12 in a case where the signal level G2 of the N-line is higher than the second carrier waveform pattern CW21, that is, the R-phase, and sets the switch signal φSRN to an on-level, and sets the other switch signals φSSN and φSTN connected to the N-line to an off-level. Meanwhile, the switch control unit 28 selects a −side phase, based on the comparison results from the N-line comparator CN, in the interline voltage generation section TS12 in a case where the signal level G2 of the N-line is lower than the second carrier waveform pattern CW21, that is, the T-phase, and sets the switch signal φSTN to an on-level, and sets the other switch signals φSRN and φSSN connected to the N-line to an off-level.

Furthermore, the switch control unit 28 selects a +side phase, based on the comparison results from the N-line comparator CN, in the interline voltage generation section TS13 in a case where the signal level G2 of the N-line is higher than the second carrier waveform pattern CW21, that is, the R-phase, and sets the switch signal φSRN to an on-level, and sets the other switch signals φSSN and φSTN connected to the N-line to an off-level. Meanwhile, the switch control unit 28 selects a −side phase, based on the comparison results from the N-line comparator CN, in the interline voltage generation section TS13 in a case where the signal level G2 of the N-line is lower than the second carrier waveform pattern CW21, that is, the S-phase, and sets the switch signal φSSN to an on-level, and sets the other switch signals φSRN and φSTN connected to the N-line to an off-level.

The aforementioned switching of the bidirectional switches SRP, SSP, STP, SRN, SSN, and STN performed by the switch control unit 28 is actual switching control.

[Average DC Voltage of P-N Interline Voltages]

Herein, the pulse width of the switch signal φSRP is hx, which is shortened from a pulse width x of an R-phase pulse (refer to FIG. 5(b)) proportional to the signal level G1 of the P-line (signal level h). In addition, the pulse width of the switch signal φSSP is hy, which is shortened from a pulse width y of an S-phase pulse (refer to FIG. 5(b)) proportional to the signal level G1 of the P-line (signal level h). In addition, the pulse width of the switch signal φSTP is hz, which is shortened from a pulse width z of a T-phase pulse (refer to FIG. 5(b)) proportional to the signal level G1 of the P-line (signal level h).

In addition, since each of the switch signals φSRP, φSSP, and φSTP are alternatively turned on, the R-phase voltage a, the S-phase voltage b, and the T-phase voltage c are generated, respectively, in each of periods, which are the pulse widths of the switch signals φSRP, φSSP, and φSTP. The average DC voltage Vave in the switching cycle T can be expressed as the following equation (10), in which voltages are integrated for each period, each of the integrated values are added together, and the added value is divided by the switching cycle T.

Average of P-line output voltages in the switching cycle $T = \{a(hx)+b(hy)+c(hz)\}/T = h(ax+by+cz)/T$ (10)

As in the above description, the equation (10) can be altered to the following equation (11), which is derived based on R-phase pulse width $x=T|a|$, S-phase pulse width $y=T|b|$, and T-phase pulse width $z=T|c|$.

Average of P-line output voltages in the switching cycle $T = h(a^2+b^2+c^2)$ (11)

Furthermore, according to the AC theory, the equation (11) can be altered to the following equation (12), which is derived based on $a^2+b^2+c^2=3/2$.

Average of P-line output voltages in the switching cycle $T = h \times 3/2$ (12)

Similarly, the pulse width of the switch signal φSRN is the absolute value of −hx, which is shortened from the pulse width x of the R-phase pulse (refer to FIG. 5(b)) proportional to a signal level −h, which is an N-line control level G2. In addition, the pulse width of the switch signal φSSN is the absolute value of −hy, which is shortened from the pulse width y of the S-phase pulse (refer to FIG. 5(b)) proportional to the signal level −h, which is the N-line control level G2. In addition, the pulse width of the switch signal φSTN is the absolute value of −hz, which is shortened from the pulse width z of the T-phase pulse (refer to FIG. 5(b)) proportional to the signal level −h, which is the N-line control level G2.

Accordingly, an average of N-line output voltages in the switching cycle T is expressed as the following equation (13).

$$\text{Average of N-line output voltages in the switching cycle } T = \{a(-hx)+b(-hy)+c(-hz)\}/T = -h(ax+by+cz)/T \quad (13)$$

As in the above description, the equation (13) can be altered to the following equation (14), which is derived based on R-phase pulse width $x=T|a|$, S-phase pulse width $y=|b|$, and T-phase pulse width $z=T|c|$.

$$\text{Average of N-line output voltages in the switching cycle } T = -h(a^2+b^2+c^2) \quad (14)$$

Furthermore, according to the AC theory, the equation (14) can be altered to the following equation (15), which is derived based on $a^2+b^2+c^2=3/2$.

$$\text{Average of N-line output voltages in the switching cycle } T = -h \times 3/2 \quad (15)$$

As a result, both of an average of P-line output voltages in the switching cycle T and an average of N-line output voltages in the switching cycle T are proportional to the signal levels h and −h. As illustrated in FIG. 5(h), a P-N interline voltage in the switching cycle T (t1 to t2) has a signal pattern in which the switch signals φSRN, φSSN, and φSTN are subtracted from the switch signals φSRP, φSSP, and φSTP.

In addition, an average of P-N interline voltages between the P-line and the N-line is expressed as the following equation (16), which is obtained by subtracting a value of the equation (15) from a value of the equation (12).

$$\text{Average DC voltage Vave of P-N interline voltages} = h \times 3/2 - (-h \times 3/2) = h \times 3 \quad (16)$$

Accordingly, the average DC voltage Vave of P-N interline voltages is proportional to the signal level h.

The signal level G1 of the P-line is +h and the signal level G2 of the N-line is −h in the aforementioned switching cycle T as illustrated in FIG. 5 but a value of the signal level G2 of the N-line may be set to 0 at all times.

[Modes m2 to m6]

In the mode m2, as illustrated in FIGS. 6(e) and (f), the second carrier waveform pattern generating unit 24 determines the second carrier waveform pattern CW22 that has an ascending saw-tooth wave, a descending saw-tooth wave, and a descending saw-tooth wave in the interline voltage generation sections TS21, TS22, and TS23 in this order as the second carrier waveform pattern CW2 to be used in virtual DC/DC conversion processing.

In the mode m2, as in the mode m1, the P-line comparator CP compares the second carrier waveform pattern CW22 with the signal level G1 of the P-line as illustrated in FIG. 6(e). Then, the switch control unit 28 controls the switching of the bidirectional switches SRP, SSP, and STP connected to the P-line based on the comparison results from the P-line comparator CP, as illustrated in FIG. 6(g). In addition, the N-line comparator CN compares the second carrier waveform pattern CW22 with the signal level G2 of the N-line, as illustrated in FIG. 6(f). Then, the switch control unit 28 controls the switching of the bidirectional switches SRN, SSN, and STN connected to the N-line based on the comparison results from the N-line comparator CN, as illustrated in FIG. 6(g). As a result, a P-N interline voltage in the mode m2 is generated as illustrated in FIG. 6(h). In addition, the average DC voltage Vave of P-N interline voltages in each switching cycle T is proportional to the signal levels h and −h. Furthermore, as described above, a current direction and current value of the P-line are determined based on a magnitude relation between the average DC voltage Vave and the P-N interphase voltage Vb. For example, in a case where the average DC voltage Vave, when the signal level G1 is 0.5 and the signal level G2 is −0.5, is the same value as the P-N interphase voltage Vb, the average DC voltage Vave exceeds the P-N interphase voltage Vb by making the signal level G1 higher than 0.5 and making the signal level G2 lower than −0.5. At this time, a current flows from the three-phase AC power supply PS side to the storage battery LD side.

In the mode m3, as illustrated in FIGS. 7(e) and (f), the second carrier waveform pattern generating unit 24 determines the second carrier waveform pattern CW23 that has an ascending saw-tooth wave, an ascending saw-tooth wave, and a descending saw-tooth wave in the interline voltage generation sections TS31, TS32, and TS33 in this order as the second carrier waveform pattern CW2 to be used in virtual DC/DC conversion processing.

In the mode m3, as in the mode m1, the P-line comparator CP compares the second carrier waveform pattern CW23 with the signal level G1 of the P-line as illustrated in FIG. 7(e). Then, the switch control unit 28 controls the switching of the bidirectional switches SRP, SSP, and STP connected to the P-line based on the comparison results from the P-line comparator CP, as illustrated in FIG. 7(g). In addition, the N-line comparator CN compares the second carrier waveform pattern CW23 with the signal level G2 of the N-line, as illustrated in FIG. 7(f). Then, the switch control unit 28 controls the switching of the bidirectional switches SRN, SSN, and STN connected to the N-line based on the comparison results from the N-line comparator CN, as illustrated in FIG. 7(g). As a result, a P-N interline voltage in the mode m3 is generated as illustrated in FIG. 7(h). In addition, the average DC voltage Vave of P-N interline voltages in each switching cycle T is proportional to the signal levels h and −h. Furthermore, as described above, a current direction and current value of the P-line are determined based on a magnitude relation between the average DC voltage Vave and the P-N interphase voltage Vb.

In the mode m4, as illustrated in FIGS. 8(e) and (f), the second carrier waveform pattern generating unit 24 determines the second carrier waveform pattern CW24 that has a descending saw-tooth wave, an ascending saw-tooth wave, and a descending saw-tooth wave in the interline voltage generation sections TS41, TS42, and TS43 in this order as the second carrier waveform pattern CW2 to be used in virtual DC/DC conversion processing.

In the mode m4, as in the mode m1, the P-line comparator CP compares the second carrier waveform pattern CW24 with the signal level G1 of the P-line as illustrated in FIG. 8(e). Then, the switch control unit 28 controls the switching of the bidirectional switches SRP, SSP, and STP connected to the P-line based on the comparison results from the P-line comparator CP, as illustrated in FIG. 8(g). In addition, the N-line comparator CN compares the second carrier waveform pattern CW24 with the signal level G2 of the N-line, as illustrated in FIG. 8(f). Then, the switch control unit 28 controls the switching of the bidirectional switches SRN, SSN, and STN connected to the N-line based on the comparison results from the N-line comparator CN, as illustrated in FIG. 8(g). As a result, a P-N interline voltage in the mode m4 is generated as illustrated in FIG. 8(h). In addition, the average DC voltage Vave of P-N interline voltages in each switching cycle T is proportional to the signal levels h and −h. Furthermore, as described above, a current direction and current value of the P-line are determined based on a magnitude relation between the average DC voltage Vave and the P-N interphase voltage Vb.

In the mode m5, as illustrated in FIGS. 9(e) and (f), the second carrier waveform pattern generating unit 24 determines the second carrier waveform pattern CW25 that has a descending saw-tooth wave, an ascending saw-tooth wave, and an ascending saw-tooth wave in the interline voltage generation sections TS51, TS52, and TS53 in this order as the second carrier waveform pattern CW2 to be used in virtual DC/DC conversion processing.

In the mode m5, as in the mode m1, the P-line comparator CP compares the second carrier waveform pattern CW25 with the signal level G1 of the P-line as illustrated in FIG. 9(e). Then, the switch control unit 28 controls the switching of the bidirectional switches SRP, SSP, and STP connected to the P-line based on the comparison results from the P-line comparator CP, as illustrated in FIG. 9(g). In addition, the N-line comparator CN compares the second carrier waveform pattern CW25 with a signal level G2 of the N-line, as illustrated in FIG. 9(f). Then, the switch control unit 28 controls the switching of the bidirectional switches SRN, SSN, and STN connected to the N-line based on the comparison results from the N-line comparator CN, as illustrated in FIG. 9(g). As a result, a P-N interline voltage in the mode m5 is generated as illustrated in FIG. 9(h). In addition, the average DC voltage Vave of P-N interline voltages in each switching cycle T is proportional to the signal levels h and −h. Furthermore, as described above, a current direction and current value of the P-line are determined based on a magnitude relation between the average DC voltage Vave and the P-N interphase voltage Vb.

In the mode m6, as illustrated in FIGS. 10(e) and (f), the second carrier waveform pattern generating unit 24 determines the second carrier waveform pattern CW26 that has a descending saw-tooth wave, a descending saw-tooth wave, and an ascending saw-tooth wave in the interline voltage generation sections TS61, TS62, and TS63 in this order as the second carrier waveform pattern CW2 to be used in virtual DC/DC conversion processing.

In the mode m6, as in the mode m1, the P-line comparator CP compares the second carrier waveform pattern CW26 with the signal level G1 of the P-line as illustrated in FIG. 10(e). Then, the switch control unit 28 controls the switching of the bidirectional switches SRP, SSP, and STP connected to the P-line based on the comparison results from the P-line comparator CP, as illustrated in FIG. 10(g). In addition, the N-line comparator CN compares the second carrier waveform pattern CW26 with the signal level G2 of the N-line, as illustrated in FIG. 10(f). Then, the switch control unit 28 controls the switching of the bidirectional switches SRN, SSN, and STN connected to the N-line based on the comparison results from the N-line comparator CN, as illustrated in FIG. 10(g). As a result, a P-N interline voltage in the mode m6 is generated as illustrated in FIG. 10(h). In addition, the average DC voltage Vave of P-N interline voltages in each switching cycle T is proportional to the signal levels h and −h. Furthermore, as described above, a current direction and current value of the P-line are determined based on a magnitude relation between the average DC voltage Vave and the P-N interphase voltage Vb.

As a result, as illustrated in FIG. 3, the DC/AC system interconnection device 1 adjusts values of the signal levels G1 and G2 such that the values of the signal levels G1 and G2 become a current set value (the current direction F or B and an amount of current A) instructed by the current setting unit 50 and controls a current direction and current value of the P-line based on a magnitude relation between the average DC voltage Vave and the P-N interphase voltage Vb. That is, in the case of the current direction F, three-phase AC power is supplied to the storage battery LD side at an amount of current A, and in the case of the current direction B, DC power of the storage battery LD is supplied to the three-phase AC power supply PS side at the amount of current A.

The current detection unit 51 illustrated in FIG. 1 inputs only a current direction into the switch control unit 28. That is because the control unit 20 is requested to set a switching order that corresponds to a current direction.

In addition, in the aforementioned DC/AC system interconnection device, the switch signals φSRP, φSSP, and φSTP are modulated in accordance with the second carrier waveform pattern CW2. Due to this modulation, switching with respect to the R-phase, the S-phase, and the T-phase is modulated so as to continue in an orderly manner in a predetermined order without repetition, such as R-phase→S-phase→T-phase→R-phase, . . . , sequentially, a failure in commutation can be restricted. In addition, since modulation is performed such that switching of the switch signals φRN, φSSN, and φSTN continues in the same orderly manner, a failure in commutation can be restricted.

In addition, it is preferable that the pulse widths of the switch signals φSRP, φSSP, φSTP, φSRN, φSSN, and φSTN be larger than a cycle of a switching frequency limit of the bidirectional switch group SW. Consequently, since it is ensured that the pulse widths are larger than a switching time limit of the bidirectional switch group SW, a failure in commutation can be restricted.

(Restriction on Number of Times of Switching)

Herein, a restriction on the number of times of switching of the bidirectional switch group SW in the switching cycle T will be described. In virtual DC/DC conversion processing, three types of pulses (the R-phase pulse, the S-phase pulse, and the T-phase pulse) on the input side within one carrier waveform pattern (the switching cycle T) are modulated on an output side (the P-line and the N-line) for each of three types of interline voltage generation sections φTS.

In a case where one carrier waveform pattern is configured as a triangular wave, which is the same for each of the three types of interline voltage generation sections φTS, three times of switching are requested for each switching cycle T with respect to the bidirectional switches SRP to STN.

On the contrary, as illustrated in FIG. 5 to FIG. 10, in the DC/AC system interconnection device, the R-phase, the S-phase, and the T-phase appear with overlap with respect to one carrier waveform pattern when selection of each input voltage phase (a +side phase and a −side phase) is viewed. That is, each of the plurality of second carrier waveform patterns CW21 to CW26 illustrated in (e) and (f) of FIG. 5 to FIG. 10 are patterns of which levels change in a chevron that straddles two consecutive sections out of a plurality of interline voltage generation sections. Each of the modes m1 to m6 include the plurality of switching cycles T.

For example, as illustrated in FIGS. 5(e) and (f), the second carrier waveform pattern CW21 is a pattern of which a level changes in a chevron that straddles the interline voltage generation sections TS11 and TS12, and is a pattern of which a level changes in an inverted chevron that straddles the interline voltage generation sections TS12 and TS13.

In addition, as illustrated in FIGS. 6(*e*) and (*f*), the second carrier waveform pattern CW22 is a pattern of which a level changes in a chevron that straddles the interline voltage generation sections TS21 and TS22, and is a pattern of which a level changes in an inverted chevron that straddles the interline voltage generation sections TS23 and TS21.

In addition, as illustrated in FIGS. 7(*e*) and (*f*), the second carrier waveform pattern CW23 is a pattern of which a level changes in a chevron that straddles the interline voltage generation sections TS32 and TS33, and is a pattern of which a level changes in an inverted chevron that straddles the interline voltage generation sections TS33 and TS31.

In addition, as illustrated in FIGS. 8(*e*) and (*f*), the second carrier waveform pattern CW24 is a pattern of which a level changes in a chevron that straddles the interline voltage generation sections TS42 and TS43, and is a pattern of which a level changes in an inverted chevron that straddles the interline voltage generation sections TS41 and TS42.

In addition, as illustrated in FIGS. 9(*e*) and (*f*), the second carrier waveform pattern CW25 is a pattern of which a level changes in a chevron that straddles the interline voltage generation sections TS53 and TS51, and is a pattern of which a level changes in an inverted chevron that straddles the interline voltage generation sections TS51 and TS52.

In addition, as illustrated in FIGS. 10(*e*) and (*f*), the second carrier waveform pattern CW26 is a pattern of which a level changes in a chevron that straddles the interline voltage generation sections TS63 and TS61, and is a pattern of which a level changes in an inverted chevron that straddles the interline voltage generation sections TS62 and TS63.

More specifically, when a voltage phase with a larger voltage value is set as a +side phase and a voltage phase with a smaller voltage value is set as a −side phase, out of two voltage phases in each of a plurality of interline voltage generation sections, each of the second carrier waveform patterns CW21 to CW26 are patterns of which levels are continuous in a chevron that straddles two consecutive interline voltage generation sections to be switched in a case where there is a phase common to +side phases or −side phases when switching between a plurality of interline voltage generation sections, and are patterns of which levels change in a serrated shape at a boundary between two interline voltage generation sections to be switched in a case where there is a phase, which is inverted between a +side phase and a −side phase, when switching between the interline voltage generation sections.

For example, since there is the T-phase common to −side phases in the interline voltage generation sections TS11 and TS12, the second carrier waveform pattern CW21 is a pattern of which a level changes in a chevron that straddles the interline voltage generation sections TS11 and TS12. Since there is the R-phase common to +side phases in the interline voltage generation sections TS12 and TS13, the second carrier waveform pattern CW21 is a pattern of which a level changes in an inverted chevron that straddles the interline voltage generation sections TS12 and TS13. Since there is the S-phase, which is inverted between a +side phase and a −side phase in the interline voltage generation sections TS13 and TS11, the second carrier waveform pattern CW21 is a pattern of which a level changes in a serrated shape at a boundary between the interline voltage generation sections TS13 and TS11.

In addition, since there is the T-phase common to −side phases in the interline voltage generation sections TS21 and TS22, the second carrier waveform pattern CW22 is a pattern of which a level changes in a chevron that straddles the interline voltage generation sections TS21 and TS22. Since there is the R-phase, which is inverted between a +side phase and a −side phase in the interline voltage generation sections TS22 and TS23, the second carrier waveform pattern CW22 is a pattern of which a level changes in a serrated shape at a boundary between the interline voltage generation sections TS22 and TS23. Since there is the S-phase common to +side phases in the interline voltage generation sections TS23 and TS21, the second carrier waveform pattern CW22 is a pattern of which a level changes in an inverted chevron that straddles the interline voltage generation sections TS23 and TS21.

In addition, since there is the T-phase, which is inverted between a +side phase and a −side phase in the interline voltage generation sections TS31 and TS32, the second carrier waveform pattern CW23 is a pattern of which a level changes in a serrated shape at a boundary between the interline voltage generation sections TS31 and TS32. Since there is the R-phase common to −side phases in the interline voltage generation sections TS32 and TS33, the second carrier waveform pattern CW23 is a pattern of which a level changes in a chevron that straddles the interline voltage generation sections TS32 and TS33. Since there is the S-phase common to +side phases in the interline voltage generation sections TS33 and TS31, the second carrier waveform pattern CW23 is a pattern of which a level changes in an inverted chevron that straddles the interline voltage generation sections TS33 and TS31.

In addition, since there is the T-phase common to +side phases in the interline voltage generation sections TS41 and TS42, the second carrier waveform pattern CW24 is a pattern of which a level changes in an inverted chevron that straddles the interline voltage generation sections TS41 and TS42. Since there is the R-phase common to −side phases in the interline voltage generation sections TS42 and TS43, the second carrier waveform pattern CW24 is a pattern of which a level changes in a chevron that straddles the interline voltage generation sections TS42 and TS43. Since there is the S-phase, which is inverted between a +side phase and a −side phase in the interline voltage generation sections TS43 and TS41, the second carrier waveform pattern CW24 is a pattern of which a level changes in a serrated shape at a boundary between the interline voltage generation sections TS43 and TS41.

In addition, since there is the T-phase common to +side phases in the interline voltage generation sections TS51 and TS52, the second carrier waveform pattern CW25 is a pattern of which a level changes in an inverted chevron that straddles the interline voltage generation sections TS51 and TS52. Since there is the R-phase, which is inverted between a +side phase and a −side phase in the interline voltage generation sections TS52 and TS53, the second carrier waveform pattern CW25 is a pattern of which a level changes in a serrated shape at a boundary between the interline voltage generation sections TS52 and TS53. Since there is the S-phase common to −side phases in the interline voltage generation sections TS53 and TS51, the second carrier waveform pattern CW25 is a pattern of which a level changes in a chevron that straddles the interline voltage generation sections TS53 and TS51.

In addition, since there is the T-phase, which is inverted between a +side phase and a −side phase in the interline voltage generation sections TS61 and TS62, the second carrier waveform pattern CW26 is a pattern of which a level changes in a serrated shape at a boundary between the interline voltage generation sections TS61 and TS62. Since there is the R-phase common to +side phases in the interline voltage generation sections TS62 and TS63, the second carrier waveform pattern CW26 is a pattern of which a level changes in an inverted chevron that straddles the interline voltage generation sections TS62 and TS63. Since there is the S-phase common to −side phases in the interline voltage generation sections TS63 and TS61, the second carrier waveform pattern CW26 is a pattern of which a level changes in a chevron that straddles the interline voltage generation sections TS63 and TS61.

Furthermore, when a voltage phase with a larger voltage value is set as a +side phase and a voltage phase with a smaller voltage value is set as a −side phase, out of two voltage phases in each of a plurality of interline voltage generation sections, each of the second carrier waveform patterns CW21 to CW26 are patterns of which levels are continuous in a chevron that straddles two consecutive modes to be switched in a case where there is a phase common to +side phases or −side phases when switching between a plurality of modes, and are patterns of which levels change in a serrated shape at a boundary between two modes to be switched in a case where there is a phase, which is inverted between a +side phase and a −side phase, when switching between the modes.

For example, when switching from the mode m1 to the mode m2, there is a pattern of which a level changes in a serrated shape at a boundary between the interline voltage generation sections TS13 and TS21, since there is the S-phase, which is inverted between a +side phase and a −side phase, in the interline voltage generation sections TS13 and TS21.

In addition, when switching from the mode m2 to the mode m3, there is a pattern of which a level changes in an inverted chevron that straddles the interline voltage generation sections TS23 and TS31 since there is the S-phase common to +side phases in the interline voltage generation sections TS23 and TS31.

In addition, when switching from the mode m3 to the mode m4, there is a pattern of which a level changes in a serrated shape at a boundary between the interline voltage generation sections TS33 and TS41, since there is the S-phase, which is inverted between a +side phase and a −side phase, in the interline voltage generation sections TS33 and TS41.

In addition, when switching from the mode m4 to the mode m5, there is a pattern of which a level changes in a serrated shape at a boundary between the interline voltage generation sections TS43 and TS51, since there is the S-phase, which is inverted between a +side phase and a −side phase, in the interline voltage generation sections TS43 and TS51.

In addition, when switching from the mode m5 to the mode m6, there is a pattern of which a level changes in a chevron that straddles the interline voltage generation sections TS53 and TS61 since there is the S-phase common to −side phases in the interline voltage generation sections TS53 and TS61.

In this manner, it takes one time of selection of each phase in each switching cycle T by combining ascending and descending saw-tooth waves and configuring one carrier waveform pattern (the second carrier waveform pattern CW2). That is, a maximum voltage phase is invariably a +side phase and a minimum voltage phase is invariably a −side phase. An intermediate voltage phase is a −side phase with respect to the maximum voltage phase and is a +side phase with respect to the minimum voltage phase. A period, in which a second control signal (for example, a P-line signal level G1) is larger than the second carrier waveform pattern CW2, is selected as a +side phase, and a period, in which a second control signal (for example, the P-line signal level G1) is smaller than the second carrier waveform pattern CW2, is selected as a −side phase. In this case, it takes only one time of selection of a maximum voltage phase when a descending saw-tooth wave and an ascending saw-tooth wave are made continuous so as to form an inverted chevron. In addition, it takes only one time of selection of a minimum voltage phase when an ascending saw-tooth wave and a descending saw-tooth wave are made continuous so as to form a chevron. Consequently, in each mode, one time of switching with respect to each of the bidirectional switches SRP to STN can be realized for each switching cycle T. In addition, practically one time of switching with respect to each of the bidirectional switches SRP to STN can be realized for each switching cycle T even when switching between modes. In other words, since the same control can be realized by switching within each mode and between modes, fluctuations in an output voltage generated by intermittence due to switching (fluctuations due to dead time) can be reduced and shock of switching can also be reduced.

In addition, since each of the switch signals φSRP to φSTP of the bidirectional switches SRP to STP, which straddle a plurality of interline voltage generation sections, can be maintained at an on-level, it can be ensured that the pulse widths of the switch signals φSRP to φSTP of the bidirectional switches SRP to STP are large as illustrated in (g) of FIG. 5 to FIG. 10. The same applies to the switch signals φSRN to φSTN of the bidirectional switches SRN to STN. That is, since it can be ensured that the pulse widths are larger than the dead time even at a low load, a distortion factor of a waveform at a low load can be restricted to the same level as that at a high load.

In virtual AC/DC conversion processing in the aforementioned DC/AC system interconnection device, an average of output voltages in each switching cycle T is constant at all times. In addition, a DC current is distributed as an input current in a proportion of an input voltage. Furthermore, this input current is in a three-phase AC waveform (for example, a sinusoidal wave) when output power is constant.

That is, 1) an input current in virtual AC/DC conversion processing can be in a three-phase AC waveform (for example, a sinusoidal wave) when output power from virtual DC/DC conversion processing is constant. In general, power is constant for a short period of time (approximately 0.1 seconds). 2) An output voltage from virtual DC/DC conversion processing can be obtained with the same signal as a modulation signal (second control signal).

(Test Results)

FIG. 11 are timing charts illustrating changes in a current and voltage of each portion in a case where power is supplied in the current direction F, that is, from the three-phase AC power supply PS side to the storage battery LD side. FIG. 11(*a*) illustrates a voltage VR of the R-phase. A system phase voltage is 115 V in terms of an effective value. A current IR indicates the current IR of the R-phase. As described above, the average DC voltage Vave illustrated in FIG. 11(*c*) is, for example, an average voltage in the switching cycle T illustrated in FIG. 5(*h*). This average DC voltage Vave, in fact, is equivalent to a DC voltage of 85 V, and is larger than the P-N interphase voltage Vb on the storage battery LD side (=80 V) illustrated in FIG. 11(*e*). In addition, as illustrated in FIG. 11(*d*), a current Ib flows to the storage battery LD side is 25 A.

Meanwhile, FIG. 12 is a timing chart illustrating changes in a current and voltage of each portion in a case where power is supplied in the current direction B, that is, from the storage battery LD side to the three-phase AC power supply PS side. FIG. 12(*a*) illustrates a voltage VR of the R-phase. A system phase voltage is 115 V. A current IR indicates the current IR of the R-phase. As described above, the average DC voltage Vave illustrated in FIG. 12(*c*) is, for example, an average voltage in the switching cycle T illustrated in FIG. 5(*h*). This average DC voltage Vave, in fact, is equivalent to a DC voltage of 75 V, and is smaller than the P-N interphase voltage Vb on the storage battery LD side (=80 V) illustrated in FIG. 12(*e*). In addition, as illustrated in FIG. 12(*d*), the current Ib that flows from the storage battery LD side to the three-phase AC power supply PS side is −25 A with a current direction being considered. The current IR is shifted with respect to the voltage VR and is negative power.

In the DC/AC system interconnection device, a step-up chopper is not requested since DC/DC conversion is possible even when a DC voltage on the storage battery LD side is not raised to a value that is equal to or higher than a system voltage. In addition, although three reactors are provided for each phase on a three-phase AC power supply side in the related art, the aforementioned DC/AC system interconnection device does not request three reactors and it may be sufficient to provide only one reactor 30 disposed on the storage battery LD side since an input and output three-phase AC is in a sinusoidal wave. Furthermore, in the aforementioned DC/AC system interconnection device, charging and discharging of the storage battery LD can be easily performed only by controlling the setting of the magnitudes of the P-N interphase voltage Vb and the average DC voltage Vave.

In addition, in the aforementioned DC/AC system interconnection device, the control unit 20 performs different types of virtual AC/DC conversion processing on input three-phase AC power according to the plurality of modes m1 to m6, which are divided according to a magnitude relation between voltages of each phase in input three-phase AC power, and generates a switching pattern of the bidirectional switch circuit 10 such that different types of virtual DC/DC conversion processing according to the plurality of modes m1 to m6 are performed on the power, on which virtual AC/DC conversion processing is performed. Specifically, the control unit 20 performs virtual AC/DC conversion processing on input three-phase AC power using the first carrier waveform patterns CW11 to CW13 that are different according to the plurality of modes m1 to m6, and generates a switching pattern of the bidirectional switch circuit 10 such that virtual DC/DC conversion processing is performed on the power, on which the virtual AC/DC conversion processing is performed, using the second carrier waveform patterns CW21 to CW26 that are different according to the plurality of modes m1 to m6. Consequently, power conversion between three-phase AC power and DC power can be bidirectionally and directly performed with simple processing without performing a complicated operation such as a matrix operation.

In addition, in the aforementioned DC/AC system interconnection device, the control unit 20 compares the first carrier waveform patterns CW11 to CW13 with a first control signal (for example, the voltage |a|, the voltage |c|, the voltage (|b|+|c|−1), and the voltage (|a|+|b|−1) illustrated in (a) of FIG. 5 to FIG. 10) that corresponds to a phase (the R-phase, the S-phase, and the T-phase) on the input side in each of the plurality of modes m1 to m6, and acquires the plurality of interline voltage generation sections TS11 to TS63. Then, the control unit 20 generates the second carrier waveform patterns CW21 to CW26 that correspond to the plurality of interline voltage generation sections TS11 to TS63, compares the generated second carrier waveform patterns CW21 to CW26 with a second control signal (for example, the signal level G1 of the P-line and the signal level G2 of the N-line illustrated in (e) and (f) of FIG. 5 to FIG. 10) that corresponds to the output side (the P-line and the N-line), and generates a switching pattern of the bidirectional switch circuit 10. Consequently, virtual AC/DC conversion processing and virtual DC/DC conversion processing can be performed simply without performing a complicated matrix operation.

Furthermore, in the aforementioned DC/AC system interconnection device, the control unit 20 recognizes a maximum voltage phase, a minimum voltage phase, and an intermediate voltage phase of input three-phase AC power. Then, the control unit 20 acquires a plurality of interline voltage generation sections in one switching cycle T with the interline voltage generation sections being divided into a first section corresponding to an intermediate voltage phase and a minimum voltage phase, a second section corresponding to a maximum voltage phase and a minimum voltage phase, and a third section corresponding to a maximum voltage phase and an intermediate voltage phase. The first section includes, for example, the interline voltage generation sections TS11, TS22, TS32, TS43, TS53, and TS61 illustrated in FIG. 5 to FIG. 10. The second section includes, for example, the interline voltage generation sections TS12, TS21, TS33, TS42, TS51, and TS63 illustrated in FIG. 5 to FIG. 10. The third section includes, for example, the interline voltage generation sections TS13, TS23, TS31, TS41, TS52, and TS62 illustrated in FIG. 5 to FIG. 10. Accordingly, three types of interline voltages, including maximum-minimum, maximum-intermediate, intermediate-minimum, can be virtually generated in one switching cycle T, a virtual DC voltage can be made substantially constant from the virtual interline voltages using a physical phenomenon such as subtraction of a current, a second carrier waveform pattern written at each voltage section is compared with a second control signal, and a switch signal can be generated from the substantially constant virtual DC voltage. Consequently, an input current of the DC/AC system interconnection device 1 is easily set to a sine wave and an output voltage can be set to DC by setting a first control signal to a sinusoidal wave and setting a second control signal to DC.

In addition, in the aforementioned DC/AC system interconnection device, the second carrier waveform patterns CW21 to CW26 (refer to (e) and (f) of FIG. 5 to FIG. 10) are patterns of which levels change in a chevron that straddles two consecutive sections out of a plurality of interline voltage generation sections. Consequently, since the number of times of switching in each switching cycle T can be reduced, a switching loss of each of the bidirectional switches SRP to STN in the bidirectional switch circuit 10 can be reduced.

Furthermore, in the aforementioned DC/AC system interconnection device, it can be easily ensured that the pulse widths of the switch signals φSRP to φSTN of each of the bidirectional switches SRP to STN in the bidirectional switch circuit 10 are wide since the second carrier waveform patterns CW21 to CW26 (refer to (e) and (f) of FIG. 5 to FIG. 10) are patterns of which levels change in a chevron that straddles two consecutive sections out of a plurality of interline voltage generation sections. Consequently, a failure in commutation can be reduced. In addition, power conversion efficiency can be improved.

In addition, in the aforementioned DC/AC system interconnection device, the control unit 20 recognizes a maximum voltage phase, a minimum voltage phase, and an intermediate voltage phase of input three-phase AC power. When a voltage phase with a higher level is set as a +side phase and a voltage phase with a lower level is set as a −side phase, out of two voltage phases in each of a plurality of interline voltage generation sections, the second carrier waveform patterns CW21 to CW26 generated by the control unit 20 are patterns of which levels are continuous in a chevron that straddles two consecutive modes to be switched in a case where there is a phase common to +side phases or −side phases when switching between modes, and patterns of which levels change in a serrated shape at a boundary between two modes to be switched in a case where there is a phase, which is inverted between a +side phase and a −side phase, when switching between the modes. Consequently, practically one time of switching with respect to each of the bidirectional switches SRP to STN can be realized for each switching cycle T even when switching between modes. In other words, since the same control can be realized by switching within each mode and between modes, shock of switching can also be reduced.

Furthermore, in the aforementioned DC/AC system interconnection device, a zero cross point of a differential voltage at an intersection point of two phases of an input AC voltage is acquired and the input AC voltage of each phase can also be estimated with the zero cross point as a synchronization signal. In this case, the DC/AC system interconnection device can be configured simpler than a case where an input AC voltage of each phase is detected.

(AC/AC System Interconnection Device)

FIG. 13 is a block diagram illustrating a configuration of an AC/AC system linkage device 100 according to the embodiment. A DC-AC system linkage device 1 illustrated in FIG. 1 is a device that bidirectionally performs power conversion between the storage battery LD and the three-phase AC power supply PS but the AC/AC system linkage device 100 is a device that bidirectionally performs direct power conversion between three-phase AC power supplies PS1 and PS2. Herein, frequencies and voltages of the three-phase AC power supplies PS1 and PS2 may be any values and may be different from each other.

As illustrated in FIG. 13, in the AC/AC system linkage device 100, each of two DC/AC system interconnection devices 1a and 1b corresponding to the DC/AC system interconnection device 1 are connected to each DC power side via a DC power line 103. In addition, the DC/AC system interconnection device 1a is connected to the three-phase AC power supply PS1. Furthermore, the DC/AC system interconnection device 1b is connected to the three-phase AC power supply PS2. A reactor 104 for noise removal is connected to a DC power line 103.

The AC/AC system linkage device 100 has a power detection unit 101a that detects three-phase AC power of the three-phase AC power supply PS1 between the three-phase AC power supply PS1 and the DC/AC system interconnection device 1a, a power detection unit 101b that detects three-phase AC power of the three-phase AC power supply PS2 between the three-phase AC power supply PS2 and the DC/AC system interconnection device 1b, and an electric energy instruction unit 102.

The electric energy instruction unit 102 instructs each of sides of DC/AC system interconnection devices 1a and 1b in electric energy that moves between the three-phase AC power supply PS1 and the three-phase AC power supply PS2 based on a value of first three-phase AC power detected by the power detection unit 101a, a value of second three-phase AC power detected by the power detection unit 101b, the electric energy that moves between the first three-phase AC power supply PS1 and the second three-phase AC power supply PS2 and a current direction as a movement direction of power, which are detected by a first detection unit 51a and a second detection unit 51b.

The DC/AC system interconnection device 1a according to the embodiment will be described, referring to correspondence between the DC/AC system interconnection device 1a and a DC-AC system coordination device 1 illustrated in FIG. 1. The DC/AC system interconnection device 1a has an input capacitor (not illustrated) that corresponds to the input capacitor 40, a first bidirectional switch circuit 10a that corresponds to the bidirectional switch circuit 10, a first control unit 20a that corresponds to the control unit 20, the first detection unit 51a that corresponds to the current detection unit 51, a first voltage adjustment unit 52a that corresponds to the current adjustment unit 52, and a first voltage setting unit 50a that corresponds to the current setting unit 50. In addition, the DC/AC system interconnection device 1b has an input capacitor (not illustrated) that corresponds to the input capacitor 40, a second bidirectional switch circuit 10b that corresponds to the bidirectional switch circuit 10, a second control unit 20b that corresponds to the control unit 20, the second detection unit 51b that corresponds to the current detection unit 51, a second voltage adjustment unit 52b that corresponds to the current adjustment unit 52, and a second voltage setting unit 50b that corresponds to the current setting unit 50. The first detection unit 51a and the second detection unit 51b detect an electric energy and a current direction. In addition, the first voltage adjustment unit 52a and the second voltage adjustment unit 52b are different from the current adjustment unit 52, and generate and output signal levels G11, G12, G21 and G22 using a voltage value. Furthermore, the first voltage setting unit 50a and the second voltage setting unit 50b are different from the current setting unit 50, and output a voltage value to the first voltage adjustment unit 52a and the second voltage adjustment unit 52b, respectively. Other configurations of the DC/AC system interconnection devices 1a and 1b are the same as the configurations of the DC/AC system interconnection device 1 illustrated in FIG. 1. That is, the DC/AC system interconnection device 1a is provided as the DC/AC system interconnection device 1 illustrated in FIG. 1 and the DC/AC system interconnection device 1b that is the same as the DC/AC system interconnection device 1 is provided in place of the storage battery LD.

The electric energy instruction unit 102 sets voltage set values of the first voltage setting unit 50a and second voltage setting unit 50b such that a current direction (which is equivalent to a movement direction of power) detected by the first detection unit 51a or the second detection unit 51b and detected electric energy become a current direction (which is equivalent to a movement direction of power) and electric energy instructed by the electric energy instruction unit 102.

The first voltage setting unit 50a outputs moving electric energy input from the electric energy instruction unit 102, that is, the current direction F or B as the movement direction F or B of power that moves through the DC power line 103 and a voltage set value V1 that corresponds to moving electric energy, to the first voltage adjustment unit 52a. Similarly, the second voltage setting unit 50b outputs moving electric energy input from the electric energy instruction unit 102, that is, the current direction F or B as the movement direction F or B of power that moves through the DC power line 103 and a voltage set value V2 that corresponds to moving electric energy, to a second voltage adjustment unit 52*b*. A differential voltage between the voltage set value V1 and the voltage set value V2 is equivalent to moving electric energy.

The first voltage adjustment unit 52*a* generates the second control signals G11 and G12 for a first bidirectional switch circuit to output to the first control unit 20*a* based on the current direction F or B and moving electric energy instructed by the electric energy instruction unit 102 and the current direction F or B and moving electric energy detected by the first detection unit. For example, as illustrated in FIG. 14, the first voltage adjustment unit 52*a* outputs the second control signals G11 and G12 that correspond to, for example, the signal levels G1 and G2 illustrated in FIG. 5. In addition, the second voltage adjustment unit 52*b* generates the second control signals G21 and G22 for a second bidirectional switch circuit to output to the second control unit 20*b* based on the current direction F or B and moving electric energy instructed by the electric energy instruction unit 102 and the current direction F or B and moving electric energy detected by the second detection unit 51*b*. For example, as illustrated in FIG. 15, the second voltage adjustment unit 52*b* outputs the second control signals G21 and G22 that correspond to, for example, the signal levels G1 and G2 illustrated in FIG. 5.

As illustrated in FIG. 16, the second control signals G11 and G12 increase and decrease an average DC voltage (DC voltage according to first DC power) Vave1 in a predetermined switching cycle generated from virtual DC/DC conversion processing of the first control unit 20*a*. In addition, the second control signals G21 and G22 increase and decrease an average DC voltage (DC voltage according to second DC power) Vave2 in a predetermined switching cycle generated from virtual DC/DC conversion processing of the second control unit 20*b*. Herein, moving electric energy is proportional to the absolute value of a differential voltage between the average DC voltage Vave2 and the average DC voltage Vave1. For this reason, in a case where power is moved in the current direction F, that is, from the three-phase AC power supply PS1 to the three-phase AC power supply PS2, the average DC voltage Vave1 may be made relatively larger than the average DC voltage Vave2. Meanwhile, in a case where power is moved in the current direction B, that is, from the three-phase AC power supply PS2 to the three-phase AC power supply PS1, the average DC voltage Vave2 may be made relatively larger than the average DC voltage Vave1. Vr shown in FIG. 13 is an actual DC voltage in the DC power line 103, and |Vr|=|Vave1−Vave2| is satisfied.

For example, the electric energy instruction unit 102 fixes the voltage set value V2 of the second voltage setting unit 50*b* (set to a median value), and increases and decreases the voltage set value V1 of the first voltage setting unit 50*a* to generate a requested current direction and moving electric energy. At this time, the electric energy instruction unit 102 detects moving electric energy via the first detection unit 51*a*. In a case where the detected moving electric energy reaches a target value, the electric energy instruction unit 102 fixes the voltage set value V1, thereby determining the second control signals G11 and G12 and the second control signals G21 and G22. Meanwhile, in a case where the detected moving electric energy does not reach the target value, the electric energy instruction unit 102 sets a voltage set value to a maximum or a minimum according to a current direction.

Specifically, in a case where desired moving electric energy moves in the current direction F, an electric energy instruction unit 102 fixes the voltage set value V2 at a median value and makes the voltage set value V1 larger than the voltage set value V2. Herein, if desired moving electric energy can be obtained based on detection results from the first detection unit, the electric energy instruction unit 102 determines the second control signals G11 and G12 and second control signals G21 and G22 that correspond to the voltage set values V1 and V2. Meanwhile, in a case where desired moving electric energy cannot be obtained, that is, in a case where desired moving electric energy cannot be obtained even when the voltage set value V1 is set to a maximum, the electric energy instruction unit 102 fixes the voltage set value V2 at a minimum and changes the voltage set value V1 by increasing and decreasing.

In addition, in a case where desired moving electric energy moves in the current direction B, the electric energy instruction unit 102 fixes the voltage set value V1 at a median value and makes the voltage set value V2 larger than the voltage set value V1. Herein, if desired moving electric energy can be obtained based on detection results from the second detection unit 51*b*, the electric energy instruction unit 102 determines the second control signals G11 and G12 and second control signals G21 and G22 that correspond to the voltage set values V1 and V2. Meanwhile, in a case where desired moving electric energy cannot be obtained, that is, in a case where desired moving electric energy cannot be obtained even when the voltage set value V2 is set to a maximum, the electric energy instruction unit 102 fixes the voltage set value V1 at a minimum and changes the voltage set value V2 by increasing and decreasing.

That is, the electric energy instruction unit 102 does not simultaneously adjust a first voltage setting unit 50*a* and a second voltage setting unit 50*b* but variably controls only one of them. By controlling in such a manner, a phenomenon in which actual moving electric energy does not converge on moving electric energy instructed by the electric energy instruction unit 102 (so-called a hunting phenomenon) can be prevented. However, it is possible to simultaneously adjust the first voltage setting unit 50*a* and the second voltage setting unit 50*b* to an extent that a hunting phenomenon does not occur. If the first voltage setting unit 50*a* and the second voltage setting unit 50*b* can be simultaneously adjusted, actual moving electric energy can be caused to rapidly approach moving electric energy instructed by the electric energy instruction unit 102.

Although movement of desired moving electric energy can be performed using the first voltage setting unit 50*a* and the second voltage setting unit 50*b* in the aforementioned embodiment, desired moving electric energy can be moved in a desired current direction through voltage adjustment only by the first voltage setting unit 50*a* or only by the second voltage setting unit 50*b*.

Therefore, movement of electric energy between the first three-phase AC power supply PS1 and the second three-phase AC power supply PS2 can be performed without going through an energy storing function of the storage battery LD.

The AC/AC system linkage device 100 illustrated in FIG. 13 is a device that DC-connects the two DC/AC system interconnection devices 1*a* and 1*b* together but may also be a device that, for example, radially DC-connects three DC/AC system interconnection devices 1*a*, 1*b*, and 1*c* together as illustrated in FIG. 17. In this case, the electric energy instruction unit 102 instructs each of sides of the DC/AC system interconnection devices 1*a* to 1*c* in electric energy that moves between each of the three-phase AC power supplies PS1 to PS3 based on electric energy detected by first to third power detection units 101*a* to 101*c*.

Herein, in the embodiment described with FIG. 1, the current detection unit 51, the current adjustment unit 52, and the current setting unit 50 detect and control moving electric energy and a current direction as a movement direction with a current as a target. Meanwhile, in the embodiment described with FIG. 13, the first detection unit 51a, a second detection unit 51b, the first voltage setting unit 50a, the second voltage setting unit 50b, the first voltage adjustment unit 52a, and the second voltage adjustment unit 52b detect and control moving electric energy and a current direction as a movement direction with a voltage as a target. However, since it may be sufficient that the invention can detect and control moving electric energy and a current direction as a movement direction, a detection target and a control target may be only a current, or may be a current and a voltage.

EXPLANATION OF REFERENCE 1, 1a, 1b, 1c: DC/AC system interconnection device
10: bidirectional switch circuit
10a: first bidirectional switch circuit
10b: second bidirectional switch circuit
20: control unit
20a: first control unit
20b: second control unit
21: synchronization signal detection unit
22: first carrier waveform pattern generating unit
23: phase information generating unit
24: second carrier waveform pattern generating unit
27: inverter
28: switch control unit
30, 104: reactor
40: input capacitor
41 to 43: capacitor
50: current setting unit
50a: first voltage setting unit
50b: second voltage setting unit
51: current detection unit
51a: first detection unit
51b: second detection unit
52: current adjustment unit
52a: first voltage adjustment unit
52b: second voltage adjustment unit
100: AC/AC system linkage device
101a, 101b, 101c: power detection unit
102: electric energy instruction unit
103: DC power line
CP: P-line comparator
CN: N-line comparator
LD: storage battery
PS, PS1 to PS3: three-phase AC power supply
G1, G2: signal level
G11, G12: second control signal for a first bidirectional switch circuit
G21, G22: second control signal for a second bidirectional switch circuit
SW: bidirectional switch group
SRP, SSP, STP, SRN, SSN, STN: bidirectional switch

The invention claimed is:

1. A DC/AC system interconnection device that is able to bidirectionally and directly perform power conversion between three-phase AC power and DC power, the device comprising:
a bidirectional switch circuit that is provided between a three-phase AC power supply and a DC power supply and turns on and off power between the three-phase AC power supply and the DC power supply;
a control unit that generates, in a predetermined switching cycle, a first carrier waveform pattern, which has a pattern that varies for each mode, according to a plurality of modes divided according to a magnitude relation between voltages in each phase in the three-phase AC power, that performs virtual AC/DC conversion processing to acquire a plurality of interline voltage generation sections, in which two phases of the three-phase AC power are selected, based on the first carrier waveform pattern in the predetermined switching cycle and a first control signal corresponding to a phase of the three-phase AC power, that generates a second carrier waveform pattern, which varies according the plurality of modes, corresponding to the plurality of interline voltage generation sections acquired from the virtual AC/DC conversion processing, and that generates a switching pattern of the bidirectional switch circuit to perform virtual DC/DC conversion processing, which varies according to the plurality of modes, on an interline voltage across two phases selected from the plurality of interline voltage generation sections based on the generated second carrier waveform pattern and a second control signal corresponding to a phase of the DC power;
a current setting unit that inputs a current set value indicating a current direction and an amount of current which flows between the DC power supply and the bidirectional switch circuit;
a current detection unit that detects the current direction and an amount of current which flows between the DC power supply and the bidirectional switch circuit; and
a current adjustment unit that generates the second control signal which increases and decreases a signal level such that the current direction and the amount of current detected by the current detection unit become the current set value.

2. The DC/AC system interconnection device according to claim 1, wherein the current adjustment unit makes an average DC voltage in the predetermined switching cycle generated from the virtual DC/DC conversion processing by the control unit larger than an interphase voltage of the DC power and generates the second control signal to adjust the amount of current based on a magnitude of a differential voltage between the interphase voltage of the DC power and the average DC voltage in a case where the three-phase AC power is converted to the DC power, and makes the average DC voltage smaller than the interphase voltage of the DC power and generates the second control signal to adjust the amount of current based on the magnitude of the differential voltage between the interphase voltage of the DC power and the average DC voltage in a case where the DC power is converted to the three-phase AC power.

3. The DC/AC system interconnection device according to claim 1, further comprising:
an inverting unit that sets the second control signal to a positive second control signal and generates a negative second control signal obtained by inverting the positive second control signal, wherein a magnitude of the average DC voltage corresponds to a difference between a signal level of the positive second control signal and a signal level of the negative second control signal.

4. The DC/AC system interconnection device according to claim 1, wherein the control unit recognizes a maximum voltage phase, a minimum voltage phase, and an intermediate voltage phase in the three-phase AC power and acquires the plurality of interline voltage generation sections by being divided into a first section corresponding to the intermediate voltage phase and the minimum voltage phase, a second section corresponding to the maximum voltage phase and the minimum voltage phase, and a third section corresponding to the maximum voltage phase and the intermediate voltage phase.

5. The DC/AC system interconnection device according to claim 1, wherein the second carrier waveform pattern has a pattern of which a level changes in a chevron that straddles two consecutive sections out of the plurality of interline voltage generation sections.

6. The DC/AC system interconnection device according to claim 1, wherein when a voltage phase with a larger voltage value is set as a +side phase and a voltage phase with a smaller voltage value is set as a −side phase, out of two voltage phases in each of the plurality of interline voltage generation sections, the second carrier waveform pattern has a pattern of which a level is continuous in a chevron that straddles two interline voltage generation sections to be switched in a case where there is a phase common to +side phases or −side phases when switching between the interline voltage generation sections, and has a pattern of which a level changes in a serrated shape at a boundary between two interline voltage generation sections to be switched in a case where there is a phase, which is inverted between a +side phase and a −side phase, when switching between the interline voltage generation sections.

\* \* \* \* \*